(12) United States Patent
Gramiccioni et al.

(10) Patent No.: US 10,864,508 B2
(45) Date of Patent: Dec. 15, 2020

(54) NANO-SIZED FUNCTIONAL BINDER

(71) Applicant: BASF Corporation, Florham Park, NJ (US)

(72) Inventors: Gary A. Gramiccioni, Madison, AL (US); Jaya L. Mohanan, Edison, NJ (US); John K. Hochmuth, Raritan, NJ (US); Kenneth R. Brown, Athens, AL (US); Brian Todd Jones, Huntsville, AL (US)

(73) Assignee: BASF Corporation, Florham Park, NJ (US)

( * ) Notice: Subject to any disclaimer, the term of this patent is extended or adjusted under 35 U.S.C. 154(b) by 41 days.

(21) Appl. No.: 15/543,404

(22) PCT Filed: Jan. 15, 2016

(86) PCT No.: PCT/US2016/013577
§ 371 (c)(1),
(2) Date: Jul. 13, 2017

(87) PCT Pub. No.: WO2016/115451
PCT Pub. Date: Jul. 21, 2016

(65) Prior Publication Data
US 2018/0008973 A1   Jan. 11, 2018

Related U.S. Application Data
(60) Provisional application No. 62/104,109, filed on Jan. 16, 2015.

(51) Int. Cl.
B01J 35/02      (2006.01)
B01J 35/10      (2006.01)
(Continued)

(52) U.S. Cl.
CPC .......... *B01J 35/023* (2013.01); *B01D 53/944* (2013.01); *B01D 53/945* (2013.01);
(Continued)

(58) Field of Classification Search
CPC . B01J 35/10; B01J 35/023; B01J 35/02; B01J 35/04; B01J 23/00; B01J 23/002;
(Continued)

(56) References Cited

U.S. PATENT DOCUMENTS 6,991,720 B2 *   1/2006   Caze ................... B01D 53/885
                                                        208/209
8,568,674 B1    10/2013   Sung et al.
(Continued)

FOREIGN PATENT DOCUMENTS

EP    05 565 54    8/1993
UA       56431 A   5/2003

OTHER PUBLICATIONS

Agrafiotis et al., "The Effect of Particle Size on the Adhesion Properties of Oxide Washcoats on Cordierite Honeycombs," *Journal of Materials Science Letters*, 1999, vol. 18, pp. 1421-1424.
(Continued)

*Primary Examiner* — Smita S Patel
(74) *Attorney, Agent, or Firm* — Womble Bond Dickinson (US) LLP

(57) ABSTRACT

Described are catalytic articles comprising a substrate having a washcoat on the substrate, the washcoat containing a catalytic component having a first average (D50) particle size and a functional binder component having a second average (D50) particle size in the range of about 10 nm to about 1000 nm, wherein the ratio of the first average (D50) particle size to the second average (D50) particle size is
(Continued)

(28.2% Porosity = Open Area)

greater than about 10:1. The catalytic articles are useful in methods and systems to purify exhaust gas streams from an engine.

17 Claims, 15 Drawing Sheets

(51) Int. Cl.
*B01D 53/94* (2006.01)
*B01J 23/10* (2006.01)
*B01J 23/63* (2006.01)
*B01J 37/02* (2006.01)
*B01J 23/83* (2006.01)
*B01J 29/76* (2006.01)
*B01J 37/00* (2006.01)
*B01J 23/00* (2006.01)
*B01J 35/04* (2006.01)
*B01J 35/00* (2006.01)

(52) U.S. Cl.
CPC ........ *B01D 53/9418* (2013.01); *B01J 23/002* (2013.01); *B01J 23/005* (2013.01); *B01J 23/10* (2013.01); *B01J 23/63* (2013.01); *B01J 23/83* (2013.01); *B01J 29/763* (2013.01); *B01J 35/04* (2013.01); *B01J 35/10* (2013.01); *B01J 37/0009* (2013.01); *B01J 37/0246* (2013.01); *B01D 2255/102* (2013.01); *B01D 2255/206* (2013.01); *B01D 2255/207* (2013.01); *B01D 2255/2073* (2013.01); *B01D 2255/20715* (2013.01); *B01D 2255/20738* (2013.01); *B01D 2255/20753* (2013.01); *B01D 2255/20761* (2013.01); *B01D 2255/402* (2013.01); *B01D 2255/405* (2013.01); *B01D 2255/407* (2013.01); *B01D 2255/50* (2013.01); *B01D 2255/908* (2013.01); *B01D 2255/9155* (2013.01); *B01D 2255/9202* (2013.01); *B01D 2255/9205* (2013.01); *B01D 2257/404* (2013.01); *B01D 2257/502* (2013.01); *B01D 2257/702* (2013.01); *B01D 2258/01* (2013.01); *B01J 35/0013* (2013.01); *B01J 2229/42* (2013.01); *Y02T 10/22* (2013.01); *Y02T 10/24* (2013.01)

(58) Field of Classification Search
CPC . B01J 23/005; B01J 23/10; B01J 23/63; B01J 23/83; B01D 53/944; B01D 53/945; B01D 53/9418; B01D 53/94; B01D 2258/01; B01D 2255/102; B01D 2255/206; B01D 2255/207; B01D 2255/402; B01D 2255/405; B01D 2255/50; B01D 2255/908; B01D 2255/9155; B01D 2255/9202; B01D 2255/9205; B01D 2255/20738; B01D 2255/2073; B01D 2255/20715; B01D 2255/20761; B01D 2255/407; B01D 2255/20753; C01P 2004/03; C01P 2004/51

See application file for complete search history.

(56) References Cited

U.S. PATENT DOCUMENTS

| | | | |
|---|---|---|---|
| 2002/0131914 A1* | 9/2002 | Sung | B01D 53/945 422/177 |
| 2006/0183636 A1 | 8/2006 | Klein et al. | |
| 2010/0189615 A1 | 7/2010 | Gramiccioni | |
| 2011/0165045 A1 | 7/2011 | Ikeda et al. | |
| 2013/0274096 A1* | 10/2013 | Wu | B01D 53/945 502/304 |
| 2014/0112854 A1 | 4/2014 | Mohanan et al. | |
| 2014/0140909 A1 | 5/2014 | Qi et al. | |
| 2014/1400909 | 5/2014 | Qi et al. | |
| 2014/0234189 A1* | 8/2014 | Clowes | B01J 35/04 423/213.5 |
| 2014/0255262 A1 | 9/2014 | Liu et al. | |
| 2015/0352492 A1* | 12/2015 | Andersen | B01D 53/8634 423/237 |

OTHER PUBLICATIONS

Mitra, et al., "Washcoating of Different Zeolites on Cordierite Monoliths," *J. Am. Ceram. Soc.*, 2008, vol. 91, pp. 64-70.

* cited by examiner (28.2% Porosity = Open Area)

L = Length of Bottom Coat (81), Top Coat (41) and Both Coating Layers (122) in microns (μm)

NANO-SIZED FUNCTIONAL BINDER

FIELD OF THE INVENTION

The present invention relates generally to the field of exhaust gas purifying catalysts. More particularly, the invention relates to catalytic articles having a washcoat on a substrate, the washcoat containing a catalyst component and a functional binder component.

BACKGROUND OF THE INVENTION

Catalytic converters treat exhaust gas streams of combustion engines to convert, trap, and/or adsorb undesirable components in order to meet stringent emissions standards. Components used in catalytic converters include, but are not limited to platinum group metals (PGMs), base metals (BMs), oxygen storage components (OSCs), and/or molecular sieves, such as zeolites. Catalytic converters are designed to meet the needs of specific applications, such as exhaust streams of diesel engines (e.g., Diesel Oxidation Catalysts (DOCs), Selective Catalytic Reduction (SCR) catalysts, and Catalyzed Soot Filters (CSF)) and exhaust streams of gasoline engines (e.g., Three-Way Conversion (TWC) catalysts).

Ceramic honeycombs are used in a variety of applications, including as particulate filters and flow-through substrates for reducing pollutants such as carbon monoxide (CO), hydrocarbons (HC), and nitrogen oxides ($NO_x$) in engine exhaust gas streams. In many of these applications, a washcoat material is applied to the honeycomb before it is used or further processed, for example, coating catalytic materials such as DOCs, SCR catalysts, and TWC catalysts onto such honeycombs. A washcoat generally, is a thin, adherent coating of a catalytic or other material applied to a substrate, such as a honeycomb-type carrier member. In some processes, a honeycomb substrate is first washcoated and the catalytic metals (for example, platinum, palladium, and/or rhodium) are applied to the washcoat after the washcoat has been dried and calcined. In other instances, the catalytic metals are deposited onto the washcoat material and the washcoat is then applied to the honeycomb. In either case, the washcoat fills the pores of the honeycomb substrate and reduces the porosity of the honeycomb substrate.

Thus, there is a need for a washcoat, e.g., for application to honeycomb substrates, that can be used with catalytic converters that is sufficiently porous to permit the passage of the exhaust gas stream being treated.

SUMMARY OF THE INVENTION

A first aspect of the invention pertains to a catalytic article for purification of exhaust gases of combustion engines. The compositions and articles disclosed herein have broad applicability and can be employed for a range of uses by tailoring the specific components thereof to address various components of exhaust gases, as will be described herein in further detail.

In a first embodiment, a catalytic article for purification of exhaust gases of combustion engines comprises a substrate having a washcoat on the substrate, the washcoat containing a catalytic component having a first average (D50) particle size and a functional binder component having a second average (D50) particle size of about 10 nm to about 1000 nm, wherein the ratio of the first average (D50) particle size to the second average (D50) particle size is greater than about 10:1.

In a second embodiment, the functional binder component of the catalytic article of the first embodiment has a structure selected from the group consisting of zeolite, Perovskite, spinel, composite, and combinations thereof.

In a third embodiment, the catalytic article of the functional binder component of the first and/or second embodiments comprises a transition metal oxide, a rare-earth metal oxide, or a combination thereof.

In a fourth embodiment, the transition metal oxide of the catalytic article of the third embodiment comprises an oxide selected from the group consisting of zirconium oxide, copper oxide, nickel oxide, iron oxide, manganese oxide, and combinations thereof.

In a fifth embodiment, the rare-earth metal oxide of the catalytic article of the third embodiment comprises an oxide selected from the group consisting of cerium oxide, lanthanum oxide, neodymium oxide, yttrium oxide, praseodymium oxide, and combinations thereof.

In a sixth embodiment, the composite of the catalytic article of the second embodiment comprises a solid solution ceria/zirconia having the general formula $Ce_{0.5}Zr_{0.5}O_2$.

In a seventh embodiment, the washcoat of the catalytic article of the first through sixth embodiments has a porosity of about 10% to about 50% as measured by scanning electron microscopy (SEM).

In an eighth embodiment, the washcoat of the catalytic article of the first through seventh embodiments has a porosity of about 20% to about 30% as measured by SEM.

In a ninth embodiment, the catalytic component of the catalytic article of the first through eighth embodiments comprises a particle size distribution of d10>about 1.0 μm, d50=about 3 μm to about 5 μm, and d90=about 9 μm to about 13 μm.

In a tenth embodiment, the catalytic component of the catalytic article of the first through ninth embodiments is selected from the group consisting of an SCR catalyst, a TWC catalyst, a diesel oxidation catalyst (DOC), and a catalyzed soot filter (CSF).

In an eleventh embodiment, the catalytic component of the catalytic article of the first through tenth embodiments comprises a high surface area metal oxide support and a component selected from the group consisting of a platinum group metal (PGM), a base metal (BM), an oxygen storage component (OSC), a molecular sieve, and combinations thereof.

In a twelfth embodiment, the high surface area metal oxide support of the catalytic article of the eleventh embodiment comprises alumina and the functional binder comprises a ceria-containing oxygen storage component (OSC), wherein the alumina to OSC ratio by weight is about 0.5 to about 10.0.

In a thirteenth embodiment, the functional binder component of the catalytic article of the first through twelfth embodiments is substantially free of platinum group metal.

In a fourteenth embodiment, the substrate of the catalytic article of the first through thirteenth embodiments is a honeycomb substrate.

In a fifteenth embodiment, the honeycomb substrate of the catalytic article of the fourteenth embodiment comprises a wall flow filter.

In a sixteenth embodiment, the honeycomb substrate of the catalytic article of the fourteenth embodiment comprises a flow through substrate.

In a seventeenth embodiment, the functional binder component of the catalytic article of the first through sixteenth embodiments comprises about 0.5 wt. % to about 40 wt. %, on a solids basis, of the washcoat.

In an eighteenth embodiment, the functional binder component of the catalytic article of the first through seventeenth embodiments has a second average (D50) particle size in the range of about 10 nm to about 40 nm.

A second aspect of the present invention is directed to a method of purifying exhaust gases.

In a nineteenth embodiment is provided a method of purifying exhaust gases comprising contacting the exhaust gases with the catalytic article of any of the first through eighteenth embodiments.

A third aspect of the present invention is directed to a method of preparing a washcoat.

In a twentieth embodiment is provided a method of preparing a washcoat, comprising providing a first catalyst component, optionally milled, having a first particle size distribution of $d_{10}$>about 1.0 µm, $d_{50}$=about 3 µm to about 5 µm, and $d_{90}$=about 9 µm to about 13 µm; providing a second catalyst component, optionally milled, having a second particle size distribution of $d_{10}$>about 1.0 µm, $d_{50}$=about 3 µm to about 5 µm, and $d_{90}$=about 9 µm to about 13 µm; mixing the first catalyst component and the second catalyst component in an aqueous solution to provide a catalytic component having a first average (D50) particle size; and combining the aqueous solution of the catalytic component with a functional binder component to provide a washcoat, wherein the functional binder component has a second average (D50) particle size of about 10 nm to about 1000 nm, wherein the ratio of the first average (D50) particle size to the second average (D50) particle size is greater than about 10:1.

In a twenty-first embodiment, the first catalyst component in the method of the twentieth embodiment comprises a high surface area metal oxide support.

In a twenty-second embodiment, the second catalyst component in the method of the twentieth and twenty-first embodiments comprises an oxygen storage component (OSC).

In a twenty-third embodiment, the high surface area metal oxide support in the method of the twentieth through twenty-second embodiments comprises alumina.

In a twenty-fourth embodiment, the high surface area metal oxide support in the method of the twenty-second embodiment comprises alumina, and the ratio of alumina to OSC is about 0.5 to about 10.0.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE PREFERRED EMBODIMENTS

Figure 1:
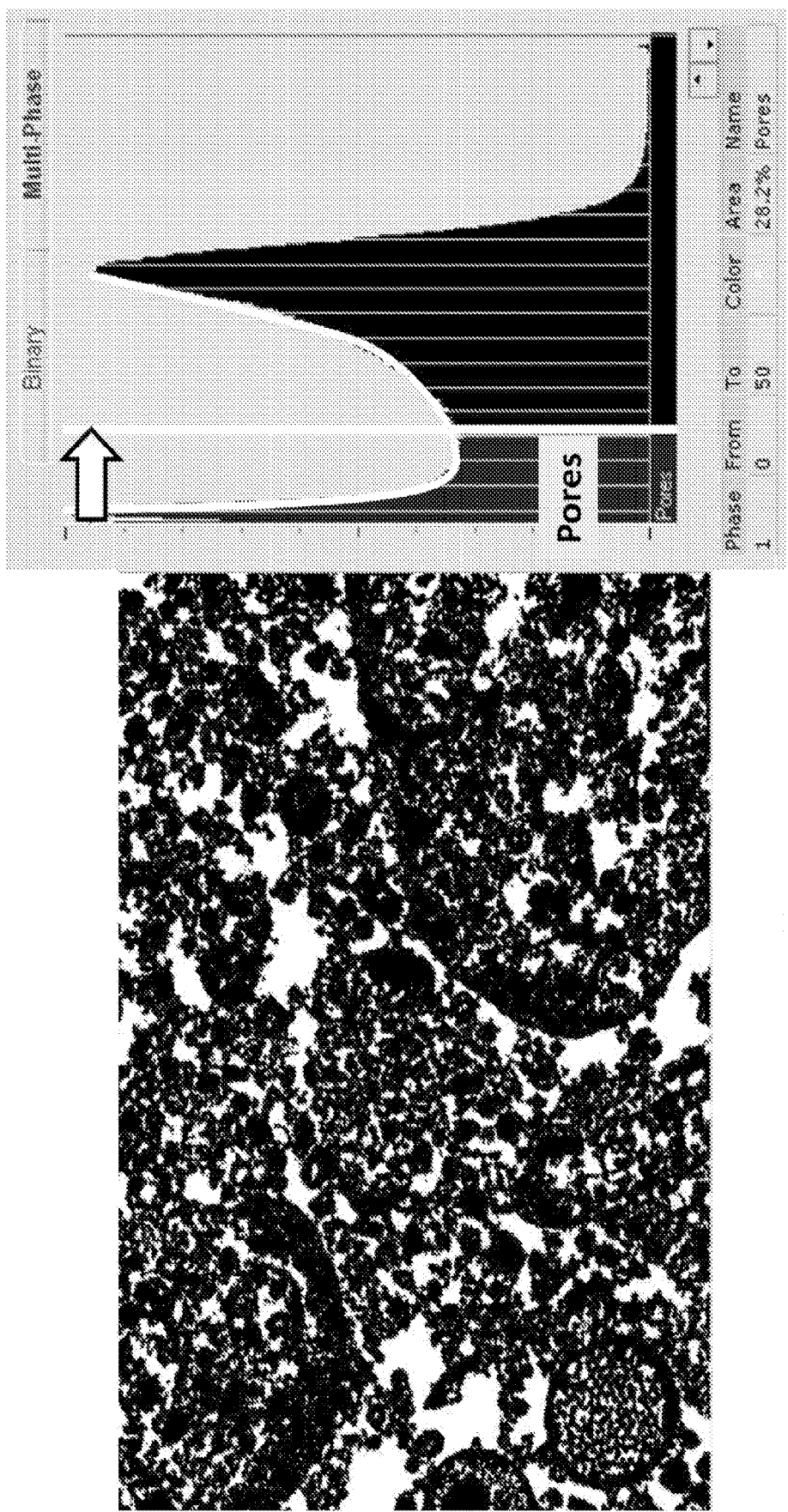
FIG. 1 is a scanning electron microscopy (SEM) image showing the porosity of a sample prepared according to one or more embodiments disclosed herein.

Before describing several exemplary embodiments of the invention, it is to be understood that the invention is not limited to the details of construction or process steps set forth in the following description. The invention is capable of other embodiments and of being practiced or being carried out in various ways.

It has been found that a porous washcoat can be created by precisely controlling the particle size distribution of the components of the washcoat. Specifically, it has been found that the use of a functional binder component having nano-sized particles can provide a washcoat that is porous and virtually crack-free.

With respect to the terms used in this disclosure, the following definitions are provided.

As used herein, the terms "catalyst" or "catalyst composition" or "catalyst material" or "catalyst component" refer to a material that promotes a reaction.

As used herein, the term "catalytic article" refers to an element that is used to promote a desired reaction. For example, a catalytic article may comprise one or more washcoats containing a catalytic species, e.g. a catalyst composition, on a substrate.

According to one or more embodiments, a catalytic article for purification of exhaust gases of combustion engines comprises a substrate having a washcoat on the substrate, the washcoat containing a catalytic component having a certain average (D50) particle size and a functional binder component having a certain average (D50) particle size, wherein the ratio of such average (D50) particle sizes is above a certain value or within a particular range (e.g., greater than about 10:1). For example, in one embodiment, such a catalytic article is provided wherein the catalytic component has a first average (D50) particle size and the functional binder component has a second average (D50) particle size of about 10 nm to about 1000 nm. In one or more embodiments, the ratio of the first average (D50) particle size to the second average (D50) particle size in such washcoats is greater than about 10:1.

In one or more embodiments, the catalytic component and the functional binder component are applied to a substrate as a washcoat. As used herein, the term "substrate" refers to a monolithic material onto which the catalyst is placed, typically in the form of a washcoat. A washcoat is generally formed by preparing a slurry containing a specified solids content (e.g., about 10% to about 50% by weight or about 30% to about 40% by weight) of solid/catalyst (here, including both the catalytic component and the functional binder component) in a liquid vehicle, which is then coated onto a substrate and dried to provide a washcoat layer on the substrate.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

Functional Binder Component

In one or more embodiments, the functional binder component has nano-sized particles with average (D50) particle size of about 10 nm to about 1000 nm, including about 10 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, and less than about 1000 nm. In specific embodiments, the functional binder component has nano-size particles with an average (D50) particle size of about 200 nm to about 400 nm, including about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, and about 400 nm. In specific embodiments, the functional binder component has nano-sized particles with an average (D50) particle size of about 10 nm to about 40 nm, including about 10 nm, about 15 nm, about 20 nm, about 25 nm, about 30 nm, about 35 nm, and about 40 nm.

As will be described in greater herein below, relevant average (D50) particle sizes of the functional binder component can be related to the average particle size of the component(s) with which the binder component is combined (e.g., catalyst components). Accordingly, beneficial average (D50) particle sizes of the functional binder component can vary widely, depending upon the average (D50) particle size of the catalytic component to be associated therewith. The average (D50) particle sizes of functional binder components as disclosed herein can be described in terms of the ratio of average (D50) particle size of catalyst component(s) to average (D50) particle size of functional binder component. Such ratios are provided and described in greater detail herein below.

The average (D50) particle sizes of the functional binder component can be measured using a CILAS 1064 Laser Particle Size Analyzer according to the manufacturer's recommended liquid mode method with a measurement range of 0.04 to 500 microns. For particles <40 nm, the average (D50) particle size can be measured using a Malvern Zetasizer Nano ZS, which is a high performance two angle particle and molecular size analyzer for the enhanced detection of aggregates and measurement of small or dilute samples, and samples at very low or high concentration using dynamic light scattering with 'NIBS' optics.

In one or more embodiments, the washcoat comprises about 0.5 wt. % to about 40 wt. %, on a solids basis, of the functional binder component, including about 0.5 wt. %, about 1 wt. %, about 5 wt. %, about 10 wt. %, about 15 wt. %, about 20 wt. %, about 25 wt. %, about 30 wt. %, about 35 wt. %, and about 40 wt. %.

Without intending to be bound by theory, it is thought that the nano-sized particles of the functional binder component serve to not only coat and/or bind the catalytic component together, but also to add functionality to the final washcoat (and the resulting catalytic article). As used herein, the terms "functional" and "functionality" refer to providing catalytic activity for conversion of components in the environment where the catalytic article is used. For example, functional binder components may include one or more of cerium oxide, zirconium oxide, neodymium oxide, and praseodymium oxide. A nano-sized zeolitic material is also considered functional, as such materials can function to trap various hydrocarbons, CO, and nitrogen oxides. For the purposes of this disclosure, alumina, titania, and/or silica nanoparticles are considered non-functional when used as individual oxides.

In one or more embodiments, the functional binder component has a structure selected from one or more of zeolite, Perovskite, spinel, or composite structures.

In some embodiments, the functional binder component has a zeolite structure. Such adsorbent molecular sieve frameworks can be used to adsorb gaseous pollutants, usually hydrocarbons, and retain them during the initial cold-start period of an engine. As the exhaust temperature increases, the adsorbed hydrocarbons are driven from the adsorbent and subjected to catalytic treatment at the higher temperature.

As used herein, the term "molecular sieves," such as zeolites and other zeolitic framework materials (e.g. isomorphously substituted materials), refers to materials which may, in particulate form, support catalytic precious group metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the term "zeolite" refers to a specific example of a molecular sieve, further including silicon and aluminum atoms. According to one or more embodiments, it will be appreciated that by defining the molecular sieves by their structure type, it is intended to include the structure type and any and all isotypic framework materials such as SAPO, ALPO and MeAPO materials having the same structure type.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates.

Generally, molecular sieves, e.g. zeolites, are defined as aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules are generally removable.

In one or more embodiments, the functional binder component has a structure comprising $SiO_4/AlO_4$ tetrahedra, linked by common oxygen atoms to form a three-dimensional network. The functional binder component of one or more embodiments can be differentiated mainly according to the geometry of the voids which are formed by the rigid network of the $SiO_4/AlO_4$ tetrahedra. The entrances to the voids are formed from 6, 8, 10, or 12 ring atoms with respect to the atoms which form the entrance opening. In one or more embodiments, the functional binder component comprises a zeolite which comprise ring sizes typically no larger than 12, such as, e.g., 4 to 12 or 6-12, including 6, 8, 10, and 12.

According to one or more embodiments, the functional binder component can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, one group of zeolites has a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the functional binder component comprises a zeolite which comprises a d6r unit. Thus, in one or more embodiments, the functional binder component has a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the functional binder component has a structure type selected from the group consisting of CHA, AEI, AFX, ERI, KFI, LEV, and combinations thereof. In still further specific embodiments, the functional binder component has a structure type selected from CHA, AEI, and AFX. In one or more very specific embodiments, the functional binder component has the CHA structure type.

In one or more embodiments, the functional binder component comprises a zeolite and is selected from an aluminosilicate zeolite, a borosilicate, a gallosilicate, a SAPO, an AlPO, a MeAPSO, and a MeAPO. In other specific embodiments, the functional binder component comprises a zeolite which has the CHA structure type and is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In one or more embodiments, the functional binder component has a Perovskite structure. As used herein, the term "Perovskite structure" refers to a material with the same type of crystal structure as calcium titanium oxide ($CaTiO_3$). The general chemical formula for perovskite compounds is $ABX_3$, wherein A and B are two cations of different sizes, and X is an anion that bonds to both A and B. Generally, the A atoms are larger than the B atoms.

In one or more embodiments, the functional binder component has a spinel structure. As used herein, the term "spinel structure" refers to materials which have the generic chemical formula $XY_2O_4$, where X is a cation with a $2^+$ charge and Y is a cation with a $3^+$ charge. The oxygen atoms in a spinel structure have a cubic close-packed structure.

In one or more embodiments, the functional binder component has a composite structure. As used herein, the term "composite structure" refers to a material which is made from two or more constituent materials with significantly different physical or chemical properties, that, when combined, produce a material with characteristics different from those of the individual components. The individual components remain separate and distinct within the final composite structure. In one or more embodiments, the functional binder component has a composite structure which comprises a solid solution ceria/zirconia having the general formula $Ce_{0.5-X}M1_xZr_{0.5-Y}M2_YO_2$, where M1 and M2 are rare earth elements including Nd, Pr, Y, La, Sm, etc., and X and Y=0.1 to 0.4. In one or more specific embodiments, the functional binder component has a composite structure which comprises a solid solution ceria/zirconia having the general formula $Ce_{0.5}Zr_{0.5}O_2$.

In specific embodiments, the functional binder component comprises one or more of a transition metal oxide or a rare-earth metal oxide.

As used herein, the term "transition metal oxide" refers to an oxide of a transition metal, which is any element in the d-block of the periodic table, including Groups 3 to 12. In one or more embodiments, the transition metal oxide is selected from zirconium oxide, copper oxide, nickel oxide, iron oxide, manganese oxide, and combinations thereof.

As used herein, the term "rare-earth metal oxide" refers to an oxide of a rare-earth metal selected from cerium (Ce), praseodymium (Pr), neodymium (Nd), europium (Eu), samarium (Sm), ytterbium (Yb), lanthanum (La), yttrium (Y), and mixtures thereof. Rare-earth metal oxides can be both oxygen storage component (OSC) materials and promoter materials. In one or more embodiments, the rare-earth metal oxide comprises cerium oxide, lanthanum oxide, neodymium oxide, yttrium oxide, praseodymium oxide, or a combination thereof.

In one or more embodiments, the functional binder component comprises an oxygen storage component (OSC). As used herein, the term "oxygen storage component" (OSC) refers to a material that has a multi-valence state and can actively react with reductants such as carbon monoxide (CO) or hydrogen under reduction conditions and then react with oxidants such as oxygen or nitrous oxides under oxidative conditions. Examples of suitable oxygen storage components comprise the rare earth oxides, particularly ceria. OSCs can also comprise one or more of lanthana, praseodymia, neodymia, niobia, europia, samaria, ytterbia, yttria, zirconia, and mixtures thereof in addition to ceria. The additional rare earth oxide, where present, may be in bulk (e.g. particulate) form. The oxygen storage component can advantageously include cerium oxide (ceria, $CeO_2$) in a form that exhibits oxygen storage properties.

In one or more embodiments, the catalytic component of the catalyst articles disclosed herein comprises a high surface area metal oxide support comprising alumina, and the functional binder component comprises a ceria-containing oxygen storage component (OSC). The alumina to OSC ratio by weight is, in some embodiments, about 1 to 100, including about 25 to 75, and about 50 to 50.

In one or more embodiments, the functional binder component is substantially free of platinum group metal. As used herein, the term "substantially free of platinum group metal" means that there is no platinum group metal intentionally added to the functional binder component, and that there is less than about 5% of platinum group metal by weight in the functional binder component. It is appreciated by one of skill in the art, however, that during loading, some platinum group present in the catalytic component can migrate to and/or contaminate the functional binder component, such that a trace amount of platinum group metal may be present in the functional binder component. In specific embodiments, there is less than about 5% by weight of platinum group metal, including less than about 4%, less than about 3%, less than about 2%, or less than about 1% by weight of platinum group metal present in the functional binder component.

Catalytic Component

In one or more embodiments, the catalytic component has a particle size distribution of $d_{10}$>about 1.0 μm, $d_{50}$=about 3 μm to about 5 μm (including about 3.0 μm, about 3.25 μm, about 3.5 μm, about 3.75 μm, about 4.0 μm, about 4.25 μm, about 4.5 μm, about 4.75 μm, and about 5.0 μm) and $d_{90}$=about 9 μm to about 13 μm (including about 9.0, about 9.25 μm, about 9.5 μm, about 9.75 μm, about 10.0 μm, about 10.25 μm, about 10.5 μm, about 10.75 μm, about 11.0 μm, about 11.25 μm, about 11.5 μm, about 11.75 μm, about 12.0 μm, about 12.25 μm, about 12.5 μm, about 12.75 μm, and about 13.0 μm). In some embodiments, $d_{90}$ may be about 10 μm to about 15 μm. Accordingly, in all embodiments referring to $d_{90}$ as being about 9 μm to about 13 μm, it is to be understood that such embodiments may alternatively encompass particles with $d_{90}$ of about 10 μm to about 15 μm.

Average (D50) particle sizes of the catalytic component can be measure using CILAS 1064 Laser Particle Size Analyzer according to the manufacturer's recommended liquid mode method with a measurement range of 0.04 to 500 microns. For particles <40 nm, the particle sizes of the catalytic component can be measured using Malvern Zetasizer Nano ZS, which is a high performance two angle particle and molecular size analyzer for the enhanced detection of aggregates and measurement of small or dilute samples, and samples at very low or high concentration using dynamic light scattering with 'NIBS' optics.

In one or more embodiments, the catalytic component is selected from an SCR catalyst, a TWC catalyst, a diesel oxidation catalyst (DOC), or a catalyzed soot filter (CSF).

As used herein, the term "selective catalytic reduction" (SCR) refers to the catalytic process of reducing oxides of nitrogen to dinitrogen ($N_2$) using a nitrogenous reductant. SCR catalysts typically comprise a molecular sieve, which can be promoted with a metal. As used herein, the term "promoted" refers to a component that is intentionally added to the molecular sieve, as opposed to impurities inherent in the molecular sieve. Thus, a promoter is intentionally added to enhance activity of a material compared to a material that does not have promoter intentionally added. For example, in order to promote the SCR of oxides of nitrogen, in one or more embodiments, a suitable metal is exchanged into the catalytic component (e.g. molecular sieves). According to one or more embodiments, the catalytic component is promoted with a metal selected from Cu, Fe, Co, Ni, La, Ce, Mn, V, Ag, and combinations thereof. In specific embodiments, the catalytic component is promoted with Cu, Fe, and combinations thereof.

SCR catalysts include any SCR catalyst materials known to those of skill in the art. For example, SCR catalysts can include CuCHA catalysts such as Cu-SSZ-13 and/or Cu-SAPO. In other embodiments, the SCR catalyst material is selected from Cu-SSZ-62, Cu-Beta, FeCHA, Fe-SSZ -13, Fe-SSZ-62, Fe-SAPO-34, Fe-Beta, and combinations thereof. In further embodiments, the catalytic material can comprise a mixed metal oxide. As used herein, the term "mixed metal oxide" refers to an oxide that contains cations of more than one chemical element or cations of a single element in several states of oxidation. In one or more embodiments, the mixed metal oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina (e.g. $Mn_xO_y/Al_2O_3$, where X=1, 2, 3 and Y=2, 3, 4), Mn/titania (e.g. $Mn_xO_y/TiO_2$, where X=1, 2, 3 and Y=2, 3, 4), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed metal oxide comprises vanadia/titania. The vanadia/titania oxide can, in some embodiments, be activated or stabilized with tungsten (e.g. $WO_3$) to provide $V_2O_5/TiO_2/WO_3$. In one or more embodiments, the catalytic component comprises titania onto which vanadia has been dispersed. The vanadia can be dispersed at concentrations ranging from about 1 wt. % to about 10 wt. %, including about 1 wt. %, about 2 wt. %, about 3 wt. %, about 4 wt. %, about 5 wt. %, about 6 wt. %, about 7 wt. %, about 8 wt. %, about 9 wt. %, or about 10 wt. %. In specific embodiments the vanadia is activated or stabilized by tungsten ($WO_3$). The tungsten can be dispersed at concentrations ranging from about 0.5 wt. % to about 15 wt. %, including about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, and about 15 wt. %. All percentages are on an oxide basis.

As used herein, the term "three-way conversion" (TWC) refers to the catalytic process of oxidizing unburned hydrocarbons (HCs) and carbon monoxide (CO) and reducing nitrogen oxides ($NO_x$) to nitrogen. TWC catalysts typically comprise one or more platinum group metals (PGMs) on a support such as a high surface area, refractory oxide support, e.g., a high surface area alumina or a composite support such as a ceria-zirconia composite. It is noted that TWC catalysts can be used with motorcycles, gasoline, and diesel engines, for both on- and off-road applications. TWC catalysts can include any TWC catalyst materials known to those of skill in the art.

As used herein, the term "platinum group metal" or "PGM" refers to one or more chemical elements defined as such in the Periodic Table of Elements, including platinum (Pt), palladium (Pd), rhodium (Rh), osmium (Os), iridium (Ir), ruthenium (Ru), and mixtures thereof.

As used herein, the term "diesel oxidation catalyst" (DOC) refers to a catalytic material that promotes the chemical oxidation of CO and HCs as well as the soot organic fraction (SOF) of diesel particulates. DOCs can also oxidize sulfur dioxide which is present in diesel exhaust from the combustion of sulfur containing fuels. DOC catalysts can include any DOC catalyst materials known to those of skill in the art.

As used herein, the term "catalyzed soot filter" (CSF) refers to a particulate filter which is coated with a catalyst and which exhibits two catalyst functions: removal of the particulate component of the exhaust stream and conversion of the $NO_x$ component of the exhaust stream to $N_2$. A CSF can comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., alumina, silica, silica alumina, zirconia, and zirconia alumina) and/or an oxidation catalyst (e.g., ceria-zirconia) for the combustion of unburned hydrocarbons and to some degree, particulate matter. In one or more embodiments, the soot burning catalyst is an oxidation catalyst comprising one or more precious metal (PM) catalysts (comprising platinum, palladium, and/or rhodium).

In one or more specific embodiments, the catalytic component comprises a high surface area metal oxide support and one or more of a platinum group metal (PGM), a base metal (BM), an oxygen storage component (OSC), or a molecular sieve.

As used herein, the term "high surface area metal oxide support" refers to the underlying high surface area material upon which additional chemical compounds or elements are carried. The high surface area metal oxide support is generally in the form of support particles with pores larger than 20 Å and a wide pore distribution. In particular embodiments, high surface area refractory metal oxide supports cam comprise alumina support materials, e.g., "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability or performance enhancement of the resulting catalyst in some embodiments. "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

One or more embodiments of the present invention include a high surface area refractory metal oxide comprising an activated compound selected from the group consisting of alumina, ceria, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, alumina-chromia, alumina-ceria, zirconia-silica, titania-silica, or zirconia-titania, and combinations thereof. In one or more embodiments, the activated refractory metal oxide is exchanged with a metal selected from the group consisting of Cu, Fe, Co, Ni, La, Ce, Mn, V, Ag, and combinations thereof.

As used herein, the term "base metal" refers to a metal that oxidizes or corrodes relatively easily. In one or more embodiments the catalytic component comprises one or more base metal selected from copper (Cu), iron (Fe), cobalt (Co), nickel (Ni), chromium (Cr), manganese (Mn), neodymium (Nd), barium (Ba), cerium (Ce), lanthanum (La), praseodymium (Pr), magnesium (Mg), calcium (Ca), zinc (Zn), niobium (Nb), zirconium (Zr), molybdenum (Mo), tin (Sn), tantalum (Ta), strontium (Sr), and combinations thereof.

Washcoat Preparation

In one or more embodiments, the catalytic component comprises more than one catalyst component, e.g. a first catalyst component and a second catalyst component. The one or more catalyst components are different populations of particles but advantageously are of substantially the same average (D50) particle size and substantially the same particle size distribution. Without intending to be bound by theory, it is thought that a modular approach, whereby catalyst components comprising hard materials are milled separately, followed by addition of catalyst components comprising jet milled softer materials produces a well-controlled, narrow particle size distribution (PSD), resulting in a washcoat with an open and porous architecture.

The catalytic component of the washcoat has a desired particle size distribution of $d_{10}$>about 1.0 µm, $d_{50}$=about 3 µm to about 5 µm, and $d_{90}$=about 9 µm to about 13 µm. The catalytic component can, in some embodiments, comprise one or more different catalyst components.

The one or more catalyst components can be milled to the desired particle size distribution, or the catalyst components can be obtained from a commercial source already milled to the desired particle size distribution. The milled catalyst components are then combined to provide a catalytic component with the desired particle size distribution. The catalytic component is then mixed with the nano-sized functional binder of one or more embodiments in a modular fashion to create an open and highly porous washcoat.

The ratio of the average (D50) particle size of the catalytic component to the average (D50) particle size of the functional binder component is 10:1 or greater, including 20:1, 50:1, 100:1, and 1000:1 or greater. Without intending to be bound by theory, it is thought that the larger the ratio of the particle size of the catalyst component to the particle size of the functional binder component, the better the washcoat is for coating/bonding to a substrate and for creating pooling between the particles of catalyst component. It is additionally thought that the use of nano-size oxide materials minimizes decomposition (cracking) and viscosity (avoids gel formation, subsequently decreasing/eliminating shrinkage and cracking) to provide a washcoat with reduced cracks as compared to washcoats wherein, e.g., oxide precursor salts are used. Accordingly, beneficial average (D50) particle sizes of the functional binder component can vary widely, depending upon the average (D50) particle size of the catalytic component to be associated therewith.

To prepare a washcoat comprising the components disclosed herein, the catalyst component or components which can comprise hard and soft materials are milled separately to the same desired target particle size distribution. The $D_{10}$ of each catalyst component is generally kept above about 1.0 micron (µm) in order to minimize the formation of fines.

Where catalyst components are combined, the slurries of catalyst components are checked for similar zeta potential and are then combined via simple mixing to obtain the catalytic component with the desired uniform particle size distribution of $d_{10}$>about 1.0 µm. $d_{50}$=about 3 µm to about 5 µm (including about 3.0 µm, about 3.25 µm, about 3.5 µm, about 3.75 µm, about 4.0 µm, about 4.25 µm, about 4.5 µm, about 4.75 µm, and about 5.0 µm) and $d_{90}$=about 9 µm to about 13 µm (including about 9.0 µm, about 9.25 µm, about 9.5 µm, about 9.75 µm, about 10.0 µm, about 10.25 µm, about 10.5 µm, about 10.75 µm, about 11.0 µm, about 11.25 µm, about 11.5 µm, about 11.75 µm, about 12.0 µm, about 12.25 µm, about 12.5 µm, about 12.75 µm, and about 13.0 µm).

Another aspect of the invention is directed to a method of preparing a washcoat. In one or more embodiments, the method of preparing a washcoat comprises providing a first catalyst component and a second catalyst component, mixing the first and second catalyst components in an aqueous solution to provide a combined catalytic component, and combining a functional binder component therewith (e.g., by adding the functional binder component to the aqueous solution of the combined catalytic component) to provide a washcoat. The first catalyst component in preferred embodiments has a first particle size distribution of $d_{10}$>about 1.0 µm, $d_{50}$=about 3 µm to about 5 µm, and $d_{90}$=about 9 to about 13 µm, and the second catalyst component has a second particle size distribution of $d_{10}$>about 1.0 µm, $d_{50}$=about 3 µm to about 5 µm, and $d_{90}$=about 9 µm to about 13 µm. The combined catalytic component and the functional binder component each have respective average (D50) particle sizes, such that the ratio of the average (D50) particle size of the combined catalytic component to the average (D50) particle size of the functional binder component is greater than about 10:1.

In one or more embodiments, the first catalyst component comprises a high surface area metal oxide support, e.g. alumina. The second catalyst component can, in such embodiments, comprise an oxygen storage component (OSC). In specific embodiments, the weight ratio of alumina to OSC in such combined catalyst components is in the range of about 1 to 100, including about 25 to 75, and about 50 to 50.

Washcoat Porosity

Figure 15:
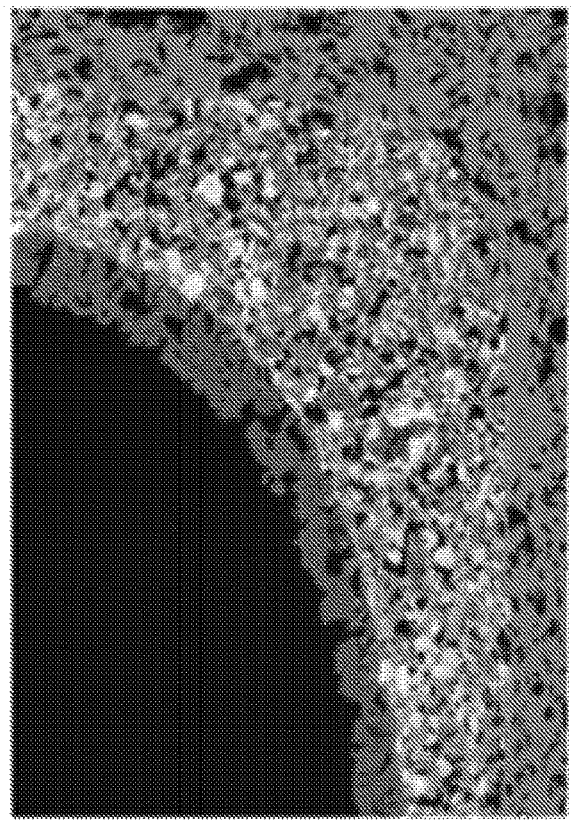
FIG. 15 provides SEM images comparing densely packed catalyst material with catalyst material comprising a nano-functional binder as disclosed herein.
Figure 15:
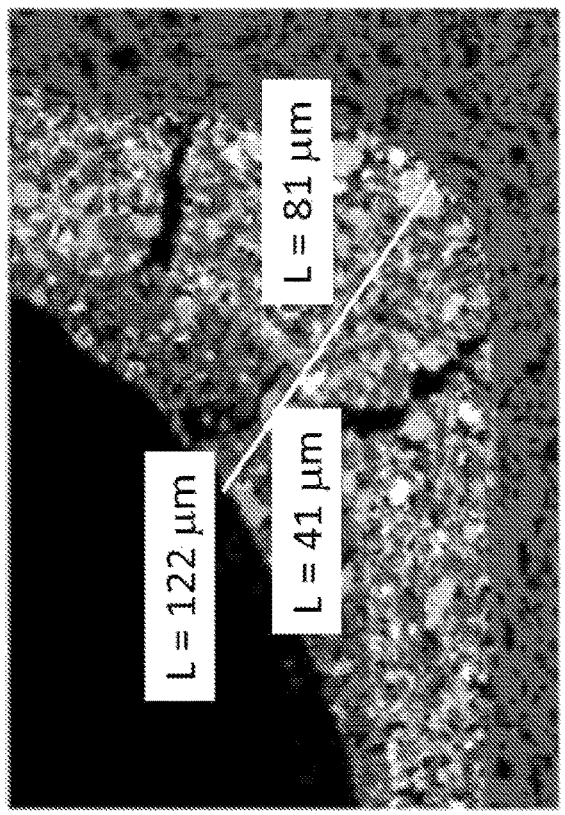

By precisely controlling the particle size distribution of the components of the washcoat, a washcoat that is generally porous is produced. Specifically, the use of the functional binder component of one or more embodiments as disclosed herein, having nano-sized particles, can result in a washcoat that is porous and virtually crack-free. The "virtually crack free" characterization of certain such washcoats can, in some embodiments, be understood to result from the high porosity of the washcoats described herein. This porosity can lead to washcoats exhibiting virtually no cracks, e.g., fewer cracks than washcoats prepared without such nano-sized binder. Consequently, in some embodiments, use of the phrase "virtually no cracks" is used in a comparative sense. One exemplary comparison is provided in FIG. 15, which provides SEM images comparing a densely packed TWC catalyst (on the left) against a catalyst comprising a nano-sized Ce/Zr functional binder (on the right). The presence of cracks in the SEM image of the densely packed TWC catalyst is apparent, whereas no cracks are observed in the SEM image of the catalyst comprising nano-sized Ce/Zr functional binder.

Figure 16:
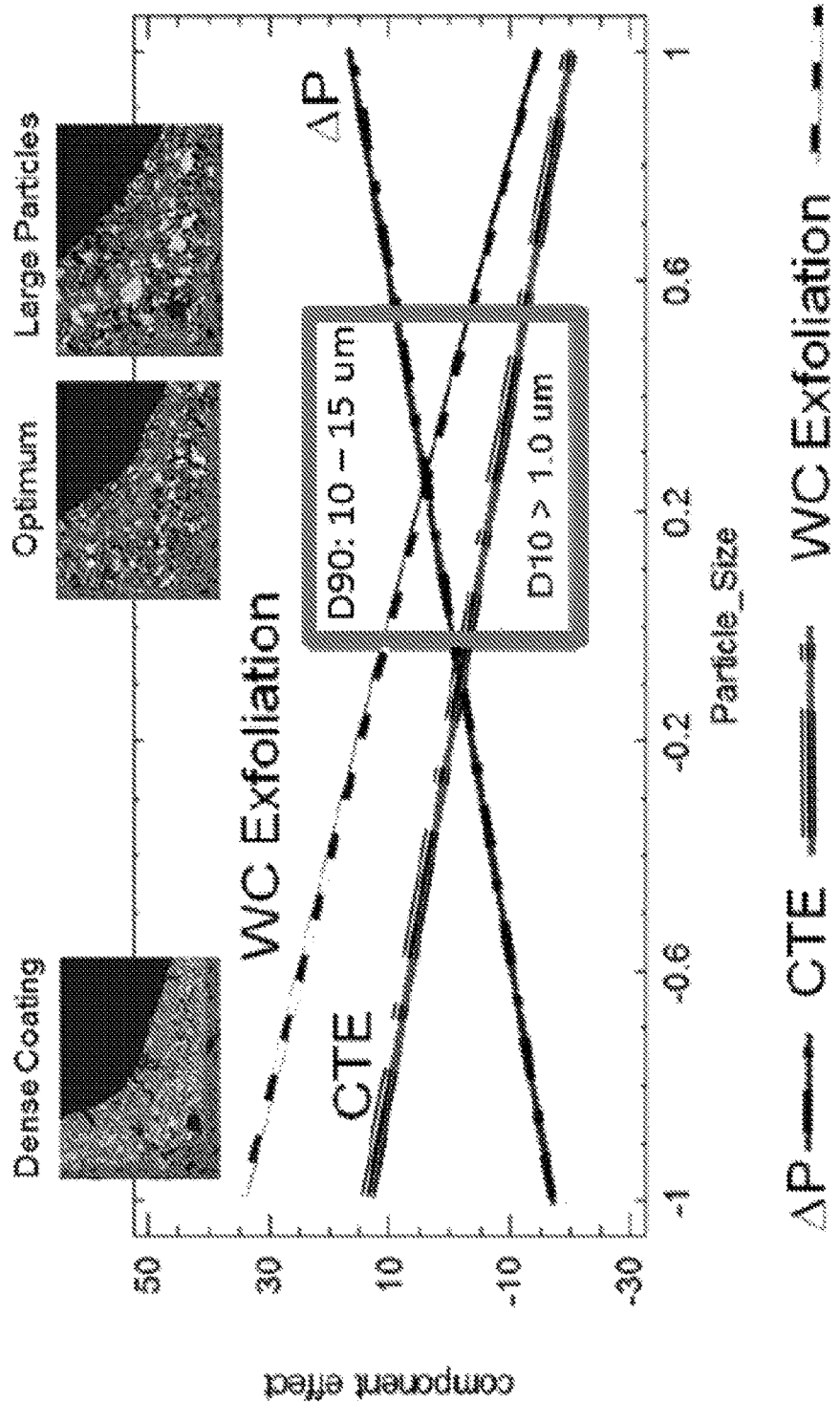
FIG. 16 provides a model of porosity and impact on crack formation.

The correlation between washcoat porosity and impact on crack formation is further detailed in FIG. 16. As apparent in this figure, providing a binder having particle sizes within the ranges disclosed herein can, in some embodiments, lead to a material exhibiting satisfactory pressure drop ΔP, coefficient of thermal expansion (CIE), and washcoat (WC) exfoliation (i.e., lack of adhesion of the washcoat to an underlying substrate). As shown, ΔP is generally reduced as particle size is reduced within the range of FIG. 16. Although not intending to be limited by theory, it is believed that larger particles begin to segregate down the channels of substrates on which they are coated, with vacuum and air pressure having a bigger impact than for smaller particles. As such, larger particles can move further down the channel and cause the channel to become plugged (leading to a higher pressure drop, ΔP). CTE and WC exfoliation are generally both increased as particle size is decreased in the range shown in FIG. 16, with too low a particle size leading to a dense coating, exhibiting low porosity and significant cracking (as shown, e.g., in the "Dense Coating" SEM image provided at the left of the graph of FIG. 16). The presently disclosed functional binder can exhibit a particle size sufficient to allow the catalyst composition in which it is contained to function (in washcoat form coated on a substrate) with relatively low ΔP, but with reasonable CTE and WC exfoliation values, such that the catalyst composition exhibits sufficient porosity with low cracking of (e.g., virtually no cracking in the washcoat, as shown, e.g., in the "Optimum" SEM image provided as the center image in FIG. 16).

In one or more embodiments, the washcoat has a porosity in the range of about 10% to about 50%, including about 10%, about 15%, about 20%, about 25%, about 30%, about 35%, about 40%, about 45%, and about 50% as measured by scanning electron microscopy (SEM). In specific embodiments, the washcoat has a 2D porosity (gray scale area comparison) in the range of about 20% to about 30%, including about 20%, about 21%, about 22%, about 23%, about 24%, about 25%, about 26%, about 27%, about 28%, about 29%, and about 30%, as measured by SEM.

As illustrated in FIG. 1, porosity measurements are made via SEM using a cross section and 2D gray scale image analysis, wherein multiple 2D images can be taken to digitally construct a 3D image/representation of the 3D pore volume. Such imaging can be accomplished using FEI's Avizo 8 software. Studies of particular materials prepared according to the present disclosure were conducted on the JEOL JSM6500F® Field Emission SEM (FE-SEM). Backscatter Electron Images (BEI) from the JEOL FE-SEM were collected at 10 kV/1500× magnification/10 mm working distance (wd). Images were captured on a Bruker Quantax EDS® (energy dispersive spectrometer) system. The Features Analysis was conducted using Bruker ESPRIT® software (Features Mode): a median filter was applied to the image; the image was binarized using the histogram as a guide; and the brightness was adjusted to cover all gray levels leaving only the black pores. A reverse video module was used to switch pore phase from background to foreground. Area fraction of the bright phase was generated.

The work was conducted on a cut/mount/polish (CMP) section from a core. For potting these samples, a commercially available two component epoxy (resin & hardener) was used. The samples were prepared in Buehler Epothin 1.0®. Once the epoxy resin and hardener were mixed, samples were potted in 1" diameter molds under vacuum for ~15 minutes. Vacuum pressure ranged from −25 mm Hg to −30 mm Hg and was applied in a Buehler Cast 'N' Vac 1000®. After 15 minutes, the samples were placed under pressure at 30 psi for 5 minutes, then left to cure in a fume hood. The epoxy used was a low viscosity room temperature cured epoxy (no heat needed). Samples were left to cure for 36 hours minimum before polishing.

In one or more embodiments, the substrate is a ceramic or metal having a honeycomb structure. Any suitable substrate may be employed, such as a monolithic substrate of the type having fine, parallel gas flow passages extending therethrough from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

Figure 2:
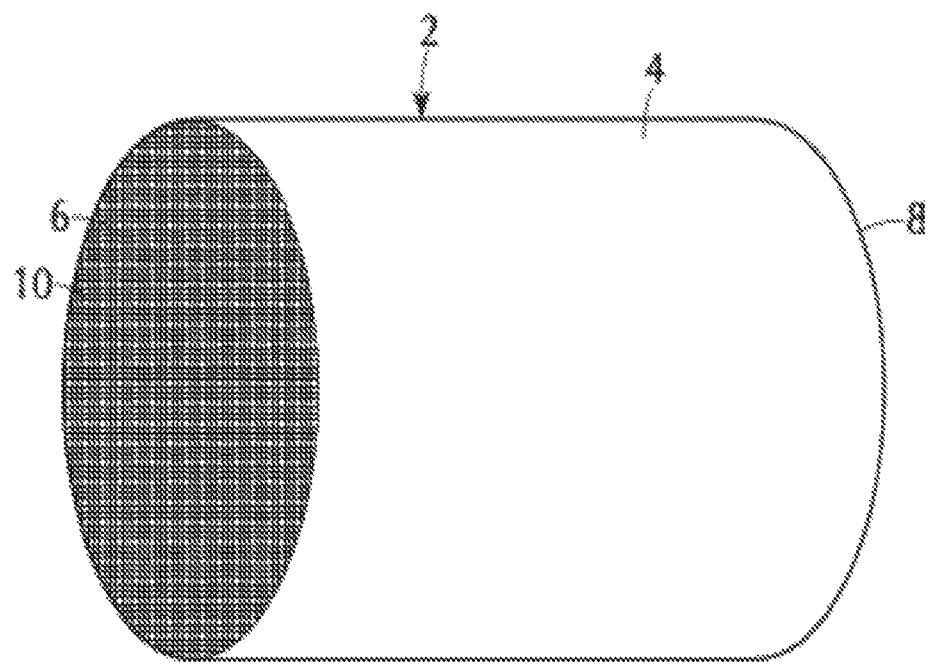
FIG. 2 is a perspective view of a honeycomb-type refractory carrier member which may be used in accordance with one or more embodiments disclosed herein.
Figure 3:
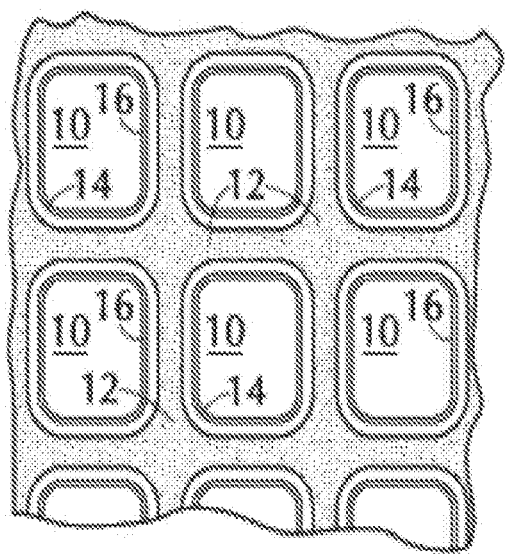
FIG. 3 is a partial cross-sectional view enlarged relative to FIG. 1, which shows an enlarged view of one of the gas flow passages shown in FIG. 1.

In one or more embodiments, the catalytic article is coated on a flow through substrate. FIG. 2 shows a refractory substrate member 2, in accordance with one or more embodiments. Referring to FIG. 2, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As see in FIG. 3, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 3, walls 12 are so dimensioned and configured that gas flow passages 10 have a substantially regular polygonal shape, substantially square in the illustrated embodiment, but with rounded corners in accordance with U.S. Pat. No. 4,335,023. A washcoat layer 14 is adhered to or coated onto the walls 12 of the substrate member. As shown in FIG. 3, an additional washcoat layer 16 can be coated over the washcoat layer 14. As will be appreciated by one of skill in the art, the washcoat layer 14 can comprise the catalytic component having a first particle size and the functional binder component having a second particle size in the range of about 10 nm to about 1000 nm of one or more embodiments as described in detail herein. The additional washcoat layer 16 can comprise a second coating of the washcoat layer of one or more embodiments, or the additional washcoat layer 16 can comprise a second catalytic component. Without intending to be bound by theory, the example of FIG. 3 was used to demonstrate functional binder action to minimize interference from other "compositionally similar" but larger particle size components.

As shown in FIG. 3, the substrate member 2 includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of catalyst substrate. Therefore, the units grams per cubic inch ("g/in$^3$") and grams per cubic foot ("g/ft$^3$") are used herein to mean the weight of a component per volume of substrate member, including the volume of void spaces of the substrate member.

In general, any known filter substrate in the art can be used, including, e.g., a honeycomb wall flow filter, wound or packed fiber filter, open-cell foam, sintered metal filter, etc., with wall flow filters being specifically exemplified. In one or more embodiments, the substrate is a wall flow filter. Wall flow substrates useful for supporting certain catalyst compositions (e.g., the CSF compositions referenced hereinabove) have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, or more usually, from about 100 to 400 cells per square inch ("cpsi"). The porous wall flow filter used in various embodiments of the invention is optionally catalyzed in that the wall of said element has thereon or contained therein one or more catalytic materials, such as the CSF catalyst compositions described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

Figure 4A:
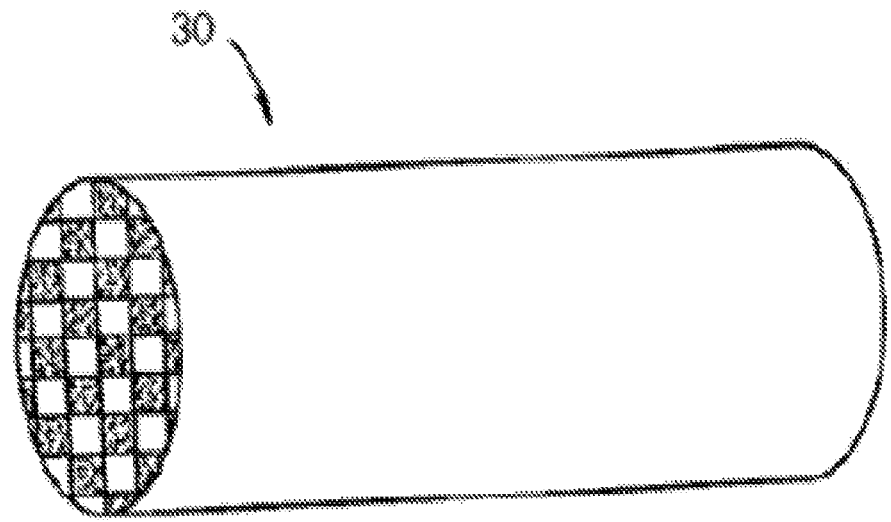
FIG. 4A shows a perspective view of a wall flow filter substrate according to one or more embodiments.
Figure 4B:
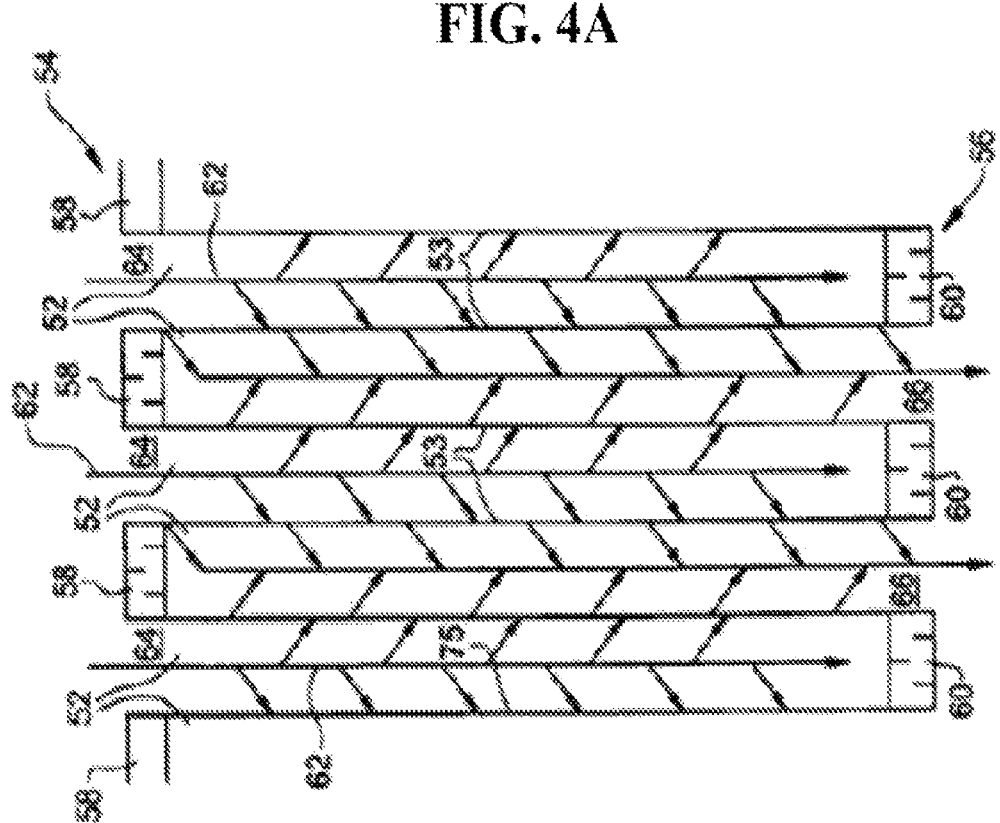
FIG. 4B shows a cutaway view of a section of a wall flow filter substrate according to one or more embodiments.

FIGS. 4A and 4B illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. In other embodiments, wall flow substrates are formed of ceramic fiber composite materials. In specific embodiments, wall flow substrates are formed from cordierite and silicon carbide. Such materials are able to withstand typical environments, particularly high temperatures, encountered in treating exhaust streams.

In one or more embodiments, wall flow substrates include thin porous walled honeycomb monoliths through which fluid streams pass without causing too great an increase in back pressure or pressure across the article. Normally, the presence of a clean wall flow article will create a back pressure of 1 inch water column to 10 psig. Ceramic wall flow substrates advantageously used for the purposes disclosed herein are formed of a material having a porosity of at least about 50% (e.g., from about 50% to about 75%) and having a mean pore size of at least about 5 microns (e.g., from about 5 microns to about 30 microns). In one or more embodiments, the substrates have a porosity of at least about 55% and have a mean pore size of at least about 10 microns. When substrates with these porosities and these mean pore sizes are coated with the techniques described below, e.g., to provide SCR catalyst articles adequate levels of catalyst compositions can be loaded onto the substrates to achieve excellent activity, e.g., excellent $NO_x$ conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are formed with lower wall porosities, e.g., from about 35% to about 50%, than the wall flow filters utilized in the invention. In general, the pore size distribution of commercial wall flow filters is typically very broad, with a mean pore size smaller than about 17 microns.

The porous wall flow filters used in one or more embodiments are catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

The substrates useful for the catalyst compositions of embodiments of the present invention may also be metallic in nature and be composed of one or more metals or metal alloys. Metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 wt. % to about 25 wt. % chromium, about 1 wt. % to about 8 wt. % of aluminum, and about 0 wt. % to about 20 wt. % of nickel.

To coat the wall flow substrates with the catalytic component and the functional binder component of one or more embodiments herein, the substrates are immersed vertically in a portion of the coating slurry, which contains the catalytic component and functional binder component, such that the top of the substrate is located just above the surface of the slurry. In this manner slurry contacts the inlet face of each honeycomb wall, but is prevented from contacting the outlet face of each wall. The sample is left in the slurry for a period of time, e.g., about 30 seconds. The substrate is then removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the coating slurry permeates the walls of the substrate, yet the pores are not occluded to the extent that undue back pressure will build up in the finished substrate. As used herein, the term "permeate" when used to describe the dispersion of the coating slurry on the substrate, means that the catalyst component is dispersed throughout the wall of the substrate.

The coated substrates are dried typically at about 100° C. and calcined at a higher temperature (e.g., about 300° C. to 600° C.) for a period of time (e.g., about 30 minutes to an hour). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Method of Purifying Exhaust Gases

Another aspect of the invention is directed to a method of purifying exhaust gases. In one or more embodiments, the exhaust gas stream of a combustion engine is contacted with the catalytic article comprising a substrate having a washcoat containing a catalytic component and a nano-sized functional binder component as described with respect to one or more embodiments herein.

The catalytic article according to one or more embodiments may be employed as a catalyst for the selective reduction (SCR) of nitrogen oxides ($NO_x$) and/or for the oxidation of $NH_3$, in particular for the oxidation of $NH_3$ slip in diesel systems.

One or more embodiments provide a method of selectively reducing nitrogen oxides ($NO_x$). In one or more embodiments, the method comprises contacting an exhaust gas stream containing $NO_x$ with the catalytic article of one or more embodiments disclosed herein. In particular, the disclosure provides for the selective reduction of nitrogen oxides wherein the selective catalytic reduction catalyst comprises a catalytic article comprising a substrate having a washcoat containing a catalytic component and a nano-sized functional binder component according to one or more embodiments as a catalytically active material, wherein the selective reduction is carried out in the presence of ammonia or urea.

While ammonia is the reducing agent of choice for stationary power plants, urea is the reducing agent of choice for mobile SCR systems. Typically, SCR systems are integrated in the exhaust gas treatment system of a vehicle and, also typically, contain the following main components: selective catalytic reduction catalyst comprising a zeolitic framework of silicon and aluminum atoms, wherein a fraction of the silicon atoms are isomorphously substituted with a tetravalent metal according to embodiments of the invention; a urea storage tank; a urea pump; a urea dosing system; a urea injector/nozzle; and a respective control unit.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

One or more embodiments provide a method of oxidizing unburned hydrocarbons (HCs) and carbon monoxide (CO) and reducing nitrogen oxides ($NO_x$) to nitrogen in an exhaust gas stream. In one or more embodiments, the method comprises contacting an exhaust gas stream containing HCs, CO, and NOx with the catalytic article of one or more embodiments. In such embodiments, the catalytic article functions as a TWC catalyst.

Exhaust Gas System

A further aspect of the invention is directed to an exhaust gas treatment system. In one or more embodiments, the exhaust gas treatment system comprises an exhaust gas stream optionally containing a reductant like ammonia, urea and/or hydrocarbon, and in specific embodiments, ammonia and/or urea, and the catalytic article of one or more embodiments. In some embodiments, the catalytic article described herein is used as a selective catalytic reduction (SCR) catalyst, wherein the catalyst is effective for destroying at least a portion of the ammonia in the exhaust gas stream. In specific embodiments, the exhaust is conveyed from the engine to a position downstream in the exhaust system, and in more specific embodiments, the exhaust contains $NO_x$, a reductant is added, and the exhaust stream with the added reductant is conveyed to the catalytic article. In other embodiments, the catalytic article is used as a TWC catalyst, wherein the catalyst is effective for oxidizing unburned hydrocarbons (HCs) and carbon monoxide (CO) and reducing nitrogen oxides ($NO_x$) to nitrogen.

An ammonia oxidation (AMOx) catalyst may be provided downstream of the catalytic article to remove any slipped ammonia from the system. In specific embodiments, the AMOx catalyst may comprise a platinum group metal such as platinum, palladium, rhodium, or combinations thereof.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalyst can be a SCR catalyst comprising a zeolite and the second catalyst can be an AMOX catalyst comprising a zeolite.

AMOx and/or SCR catalyst composition(s) can be coated on a flow through or wall-flow filter. If a wall flow substrate is utilized, the resulting system will be able to remove particulate matter along with gaseous pollutants. A wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

SSZ-13 (Cu/Chabazite) catalytic material was spray dried and the functional binder was a 3:1 mixture of colloidal Silica sol and a nano-$Ce_{0.45}Nd_{0.05}Zr_{0.5}$ 45/5/50 oxide dispersion. The SSZ-13 is dispersed in water and recycled through an in-line homogenizer @50 Hz to break large agglomerates to D90<13 μm. The functional binder is added to achieve a total binder loading of 5 wt. % calcined washcoat basis. The mixture is then coated onto a cordierite substrate, dried and calcined to 450° C. to form an active catalytic coating.

Example 2—Design 61 Variants

Design 61 is a fixed composition coating layer with Pd and Rh in one coat. To demonstrate the effects of a functional binder without influence of common components, Design 61 was used as a foundation. Design 61 Modification 3 (D61 Mod3) includes a second coating layer comprised of 0.85 g/in$^3$ large pore alumina milled to D90<13 μm, 0.15 g/in$^3$ nano-ceria/zirconia mixture (50% $CeO_2$/50% $ZrO_2$ mixture=FIG. 12) with average particle size 21.76 nm plus rhodium. The mixture is then coated onto D61 base coat, dried and calcined to 550° C. to create a segregated washcoat. High magnification SEM demonstrates that the nano-ceria/zirconia mixture coats the surface of the alumina and accumulates between particles to bind them together.

Example 3

Figure 13:
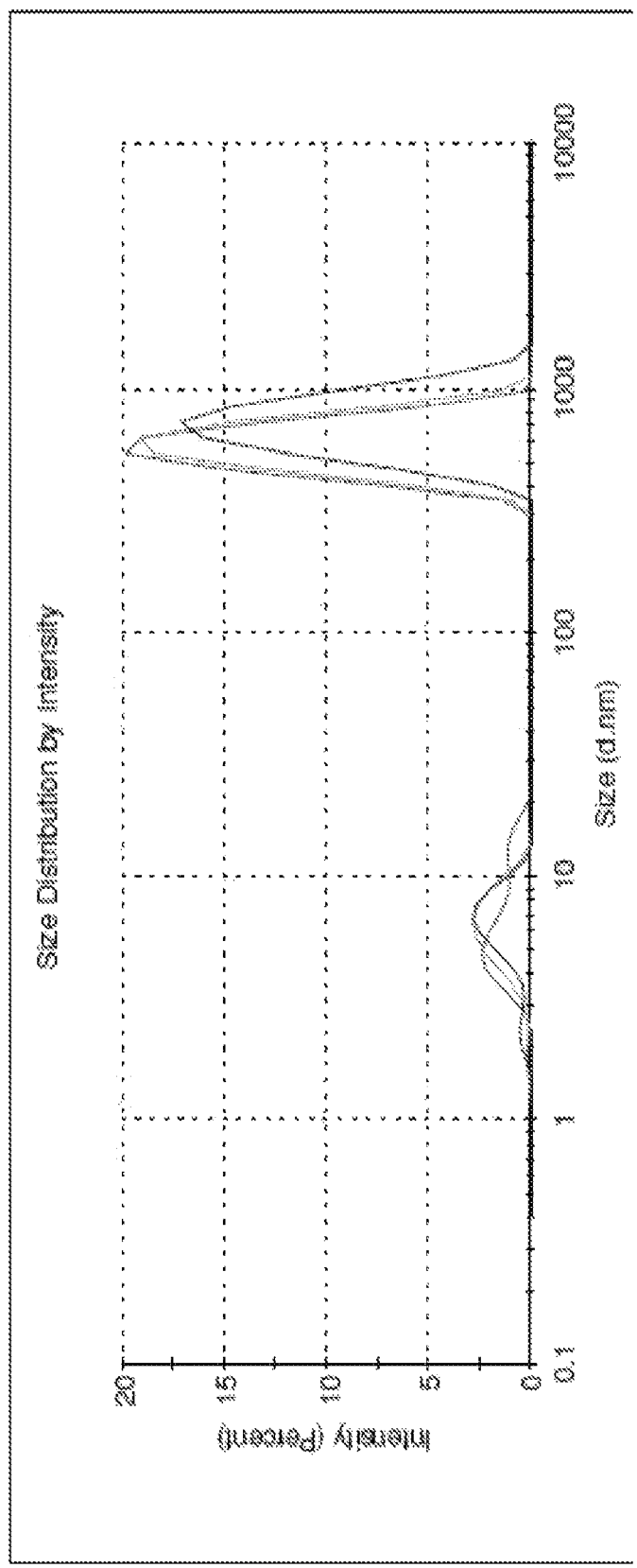
FIG. 13 is a graph of size distribution by intensity for catalytic articles prepared according to the Examples provided herein.

Design 38 Single Coat (D38 SC) is a 15% lower dry gain version of Design 38 Double Coat (D38 DC). Soluble salts, La-nitrate and Zirconyl acetate were replaced with nano-$ZrO_2/La_2O_3$ mixture (60% $ZrO_2$/40% $La_2O_3$) with average particle size 540.6 nm (FIG. 13). The percentage of nano-binder in this case is 1.5 wt. % of the total washcoat loading, which is 2.85 g/in$^3$. By combining the remaining materials (common to both SC and DC), the ratio of harder fraction to softer fraction is kept to <40 wt. % of the active coating where particle size is easier to control (maintaining a narrow distribution) to final $D_{90}$<13 μm target (range 11-13 μm). The resulting washcoat is applied to a cordierite substrate, dried and calcined to 550° C. to create the active catalyst coating, which is porous and virtually crack free.

Design 44 Single Coat is also a 15% lower dry gain version of Design 44 Double Coat (D44 DC). Soluble salts, La-nitrate and Zirconyl acetate were replaced with nano-$ZrO_2/La_2O_3$ mixture (60% $ZrO_2$/40% $La_2O_3$) with average particle size 540.6 nm (FIG. 13). The percentage of nano-binder in this case is 5.25 wt. % of the total washcoat loading, which is also 2.85 g/in$^3$. By combining the remaining materials (common to both SC and DC), the ratio of harder fraction to softer fraction is kept to <40 wt. % of the active coating where particle size is easier to control (maintaining a narrow distribution) to final $D_{90}$<13 μm target (range 11-13 μm). The resulting washcoat is applied to a cordierite substrate, dried and calcined to 550° C. to create the active catalyst coating, which is porous and virtually crack free.

Example 4—Testing

Figure 5:
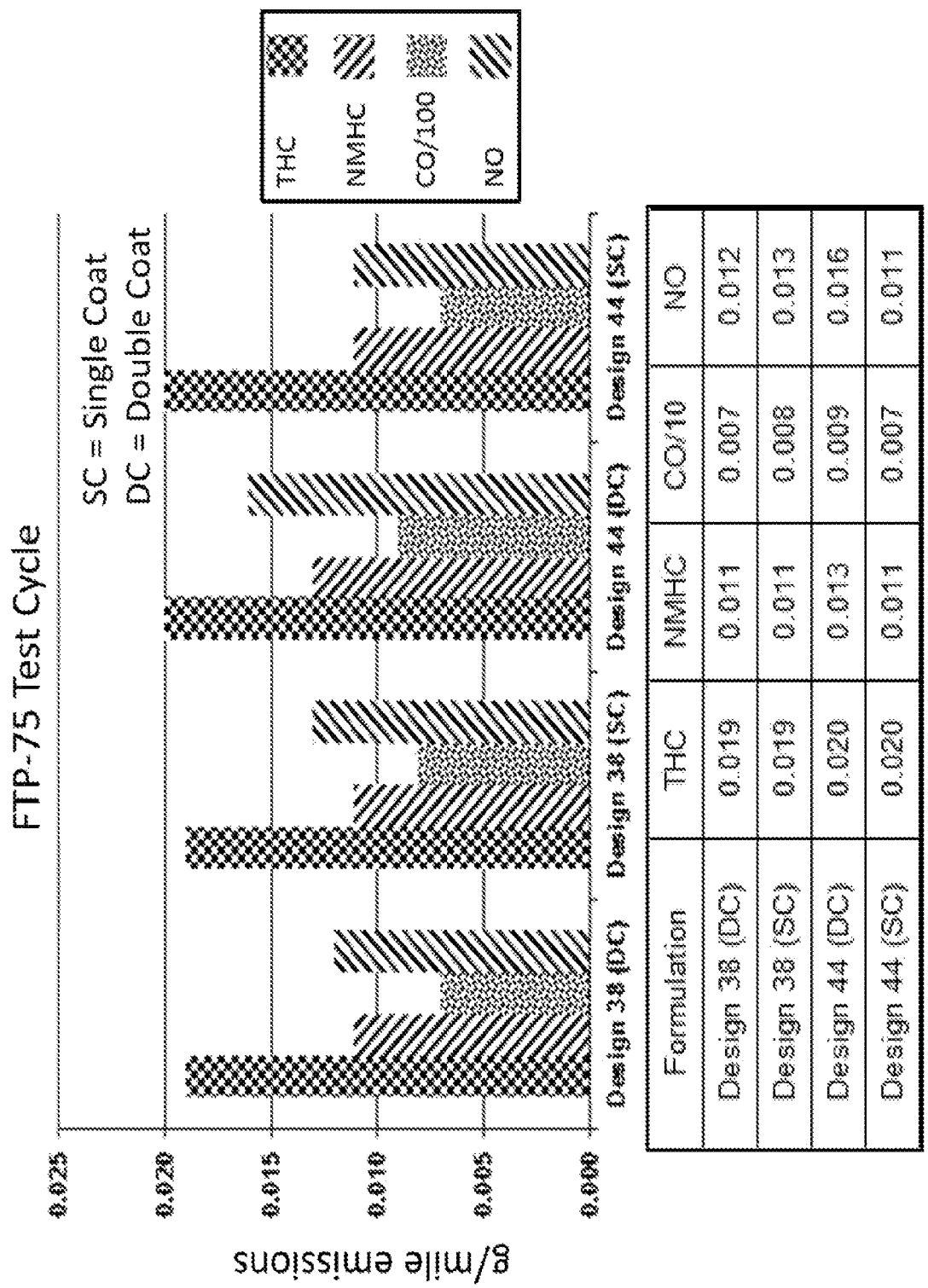
FIG. 5 is a bar graph of emission results for catalytic articles prepared according to the Examples provided herein.
Figure 6:
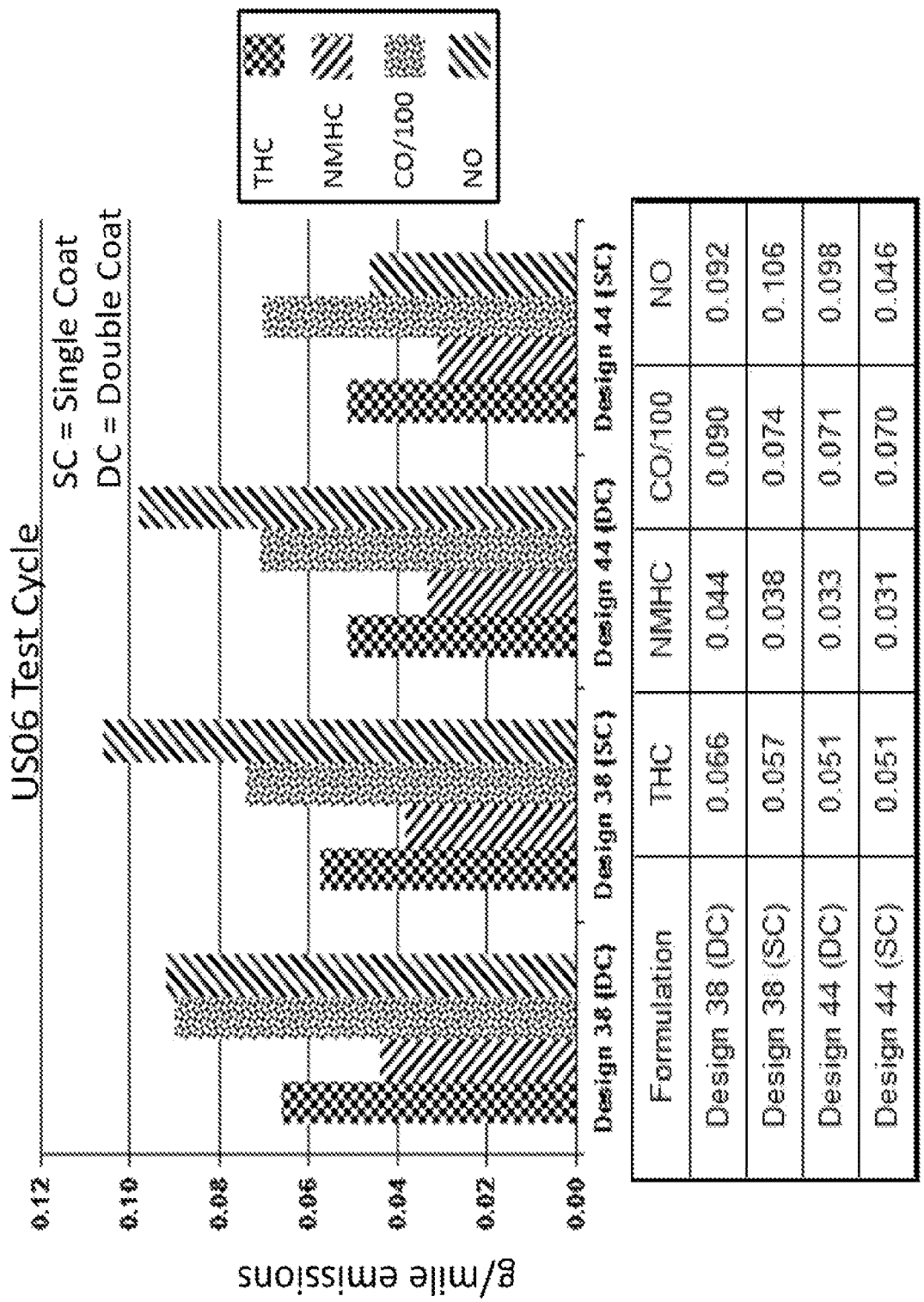
FIG. 6 is a bar graph of emission results for catalytic articles prepared according to the Examples provided herein.

FIG. 5, FIG. 6, Table 1, and Table 2 present data for various catalyst compositions, all of which were coated on 4.66" ϕ×5.36" L 400/4.5 cordierite substrates. PGM Loading was held constant in all catalysts at 21.53 g/ft$^3$, 0/3.75/1 Pt/Pd/Rh. Catalysts were aged according to GMAC 925 protocol for 159 hours. Testing was performed using a 2010 Chevrolet Malibu in the under floor catalyst (UFC) position using a constant close couple catalyst (CCC). Test cycles utilized were FTP-75 (Table 1) and higher space velocity protocol, US06 (Table 2).

TABLE 1

| FTP-75 Summary | | | | |
|---|---|---|---|---|
| Formulation | THC | NMHC | CO/10 | NO |
| Design 38 (DC) | 0.019 | 0.011 | 0.007 | 0.012 |
| Design 38 (SC) | 0.019 | 0.011 | 0.008 | 0.013 |
| Design 44 (DC) | 0.020 | 0.013 | 0.009 | 0.016 |
| Design 44 (SC) | 0.020 | 0.011 | 0.007 | 0.011 |

Design 38 SC demonstrated comparable performance to the parent double coat (Design 38 DC); however, Design 44 SC demonstrated 15%, 22% and 31% improvements in non-methane hydrocarbon (NMHC), CO and NO reductions, respectively, as compared with the parent double coat (Design 44 DC).

TABLE 2

| US06 Summary | | | | |
|---|---|---|---|---|
| Formulation | THC | NMHC | CO/100 | NO |
| Design 38 (DC) | 0.066 | 0.044 | 0.090 | 0.092 |
| Design 38 (SC) | 0.057 | 0.038 | 0.074 | 0.106 |
| Design 44 (DC) | 0.051 | 0.033 | 0.071 | 0.096 |
| Design 44 (SC) | 0.051 | 0.031 | 0.070 | 0.046 |

Design 38 SC demonstrated 13.6% and 17.8% improvements in HC and CO performances, respectively, with 15% worse NO performance relative to the parent double coat (Design 38 DC). Design 44 SC demonstrated 6%, 1.4% and 53% improvements in NMHC, CO and NO reductions, respectively, relative to the parent double coat (Design 44 DC).

Example 5—Testing

Figure 8:
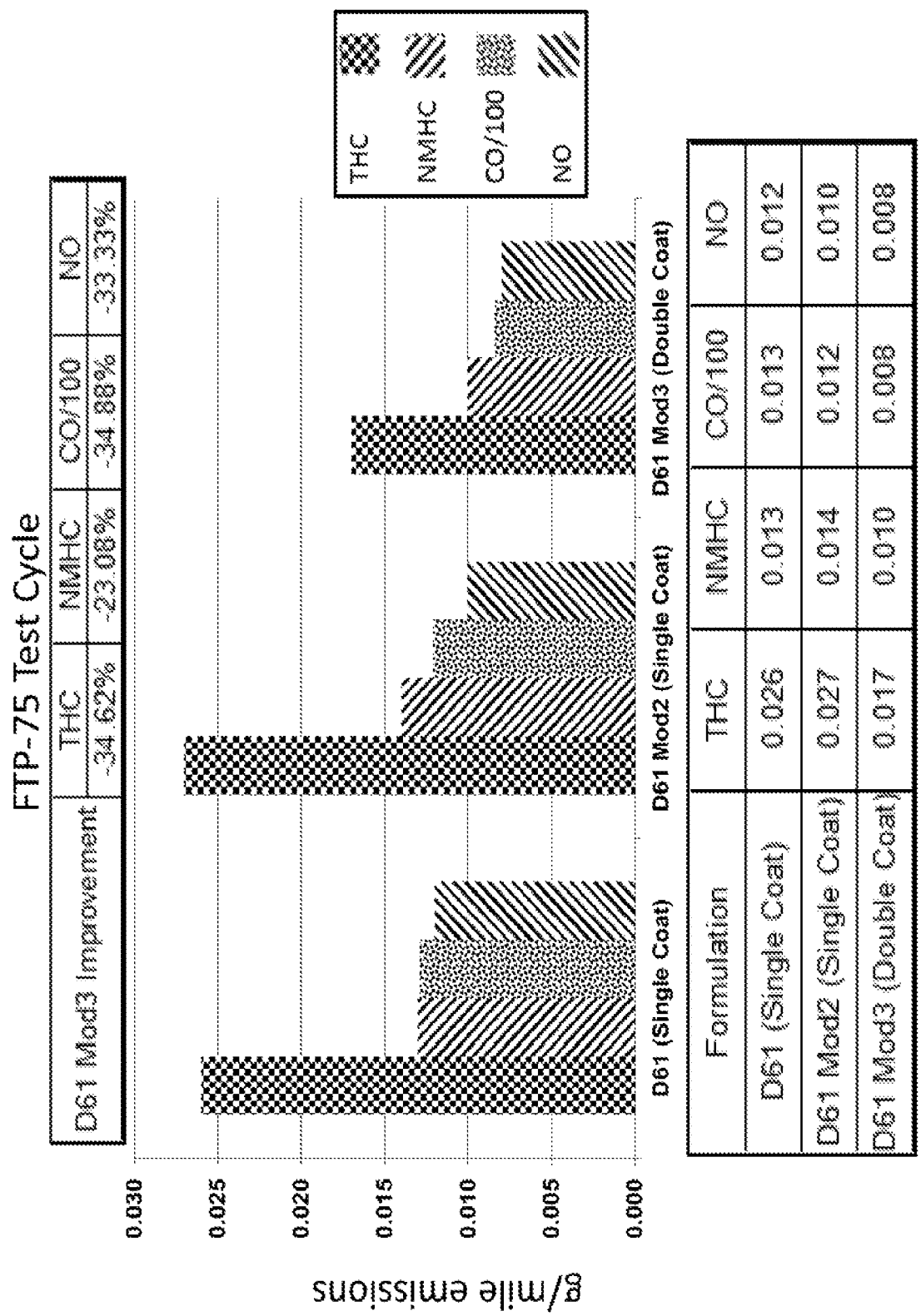
FIG. 8 is a bar graph of emission results for catalytic articles prepared according to Example 2.
Figure 9:
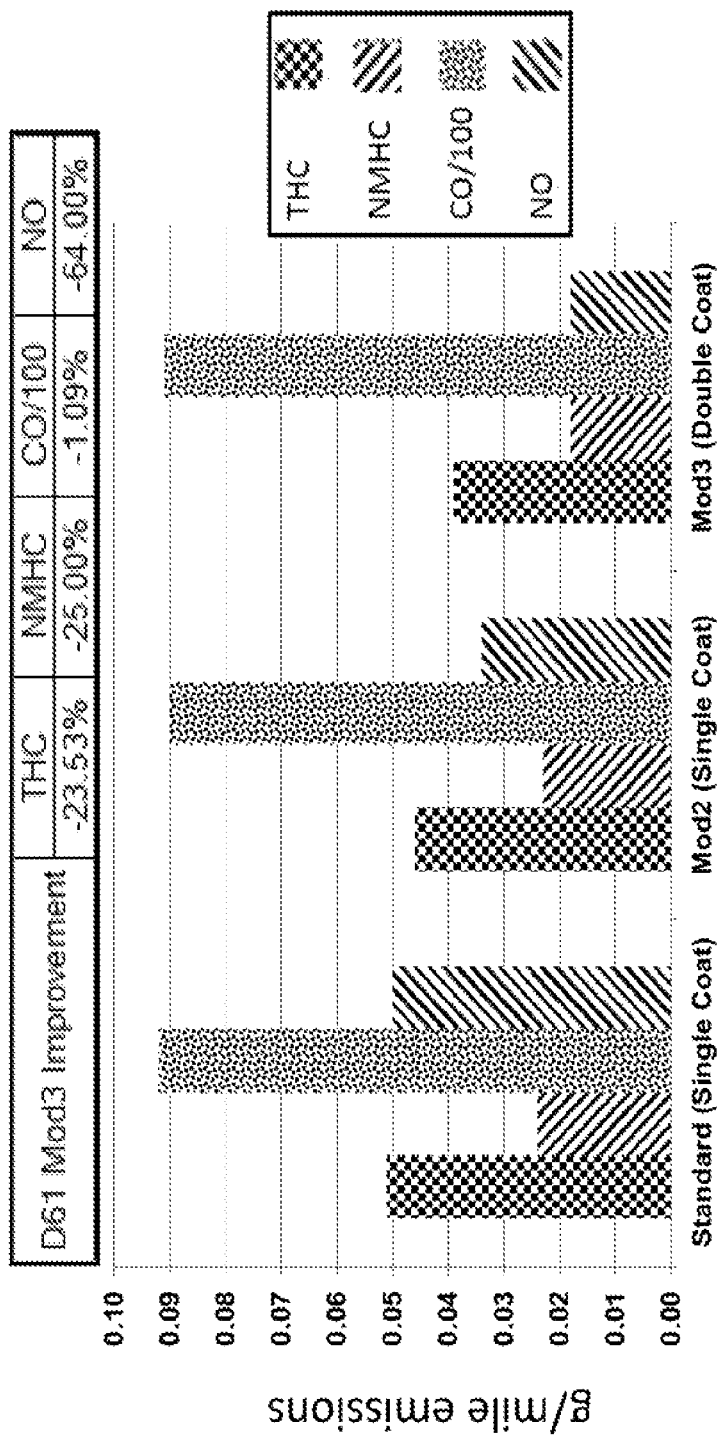
FIG. 9 is a bar graph of emission results for catalytic articles prepared according to the Examples provided herein.

FIG. 8, FIG. 9, Table 3, and Table 4 present data for various catalyst compositions, all of which were coated on 4.66" φ×2.93" L 900/2.5 at 80 g/ft$^3$, 0/76/4 close coupled catalyst (CCC) and 4.66" φ×3.50" L 400/4.5 at 30 g/ft$^3$, 0/26/4 as the under floor catalyst (UFC) on cordierite substrates. Catalysts were aged as a system using Ford aging cycle—1720TC30B-70-30, for 70 hours with Phosphorous, and for 30 hours without Phosphorus and were then tested as a system on the 2009 G M Malibu.

TABLE 3

| FTP-75 Summary | | | | |
|---|---|---|---|---|
| Formulation | THC | NMHC | CO/100 | NO |
| D61 (Single Coat) | 0.026 | 0.013 | 0.013 | 0.012 |
| D61 Mod2 (Single Coat) | 0.027 | 0.014 | 0.012 | 0.010 |
| D61 Mod3 (Double Coat) | 0.017 | 0.010 | 0.008 | 0.008 |

Design 61 Modification 3 double coat (D61 Mod3 DC) demonstrated 34.6%, 23.18%, 34.9% and 33.3% improvements in THC, NMHC, CO and NO performance, respectively relative to the parent single coat design (D61).

TABLE 4

| US06 Summary | | | | |
|---|---|---|---|---|
| Formulation | THC | NMHC | CO/100 | NO |
| D61 (Single Coat) | 0.061 | 0.024 | 0.092 | 0.050 |
| D61 Mod2 (Single Coat) | 0.046 | 0.023 | 0.090 | 0.034 |
| D61 Mod3 (Double Coat) | 0.039 | 0.018 | 0.091 | 0.018 |

Design 61 Modification 3 double coat (D61 Mod3 DC) demonstrated 23.5%, 25.0%, 1.1% and 64.0% improvements in THC, NMHC, CO and NO performance, respectively, relative to the parent single coat design (D61).

Figure 7:
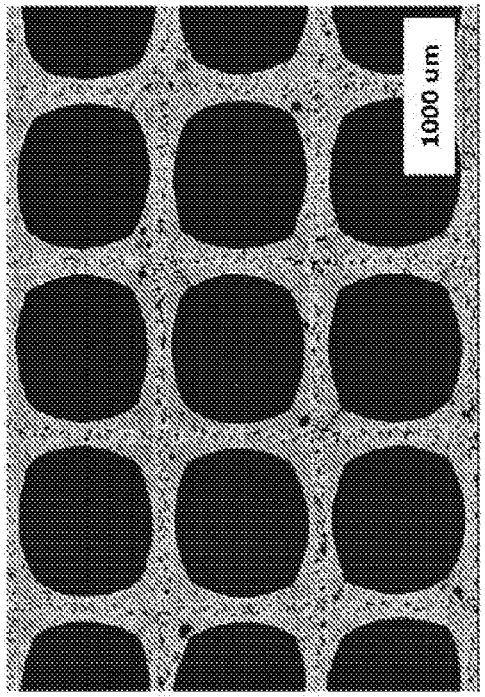
FIG. 7 provides SEM images of catalytic articles prepared according to the Examples provided herein.
Figure 7:
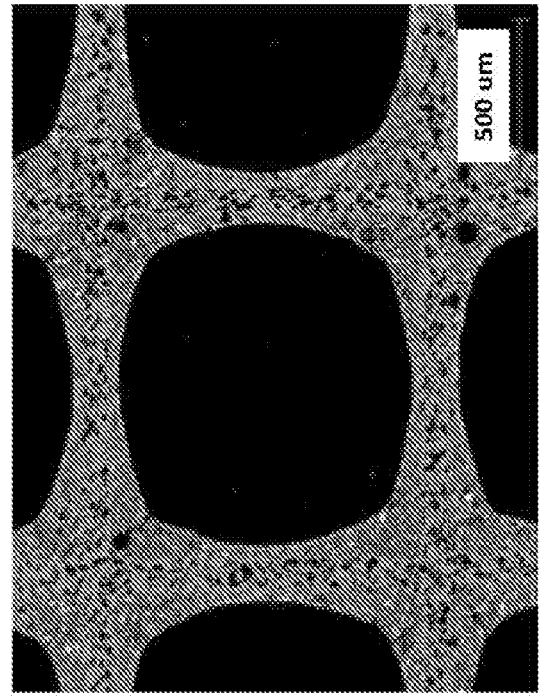
Figure 7:
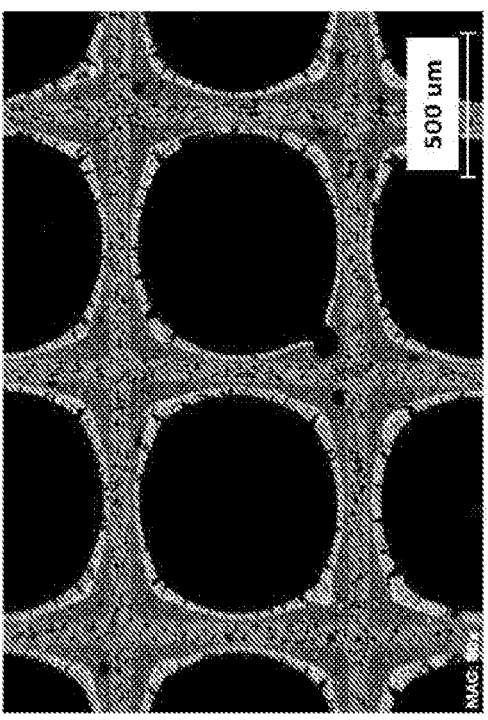
Figure 7:
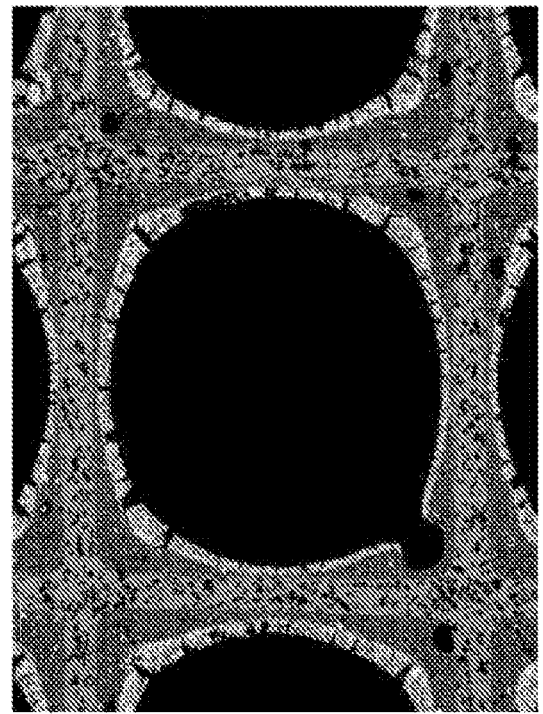

FIG. 7 shows Design 38 parent double coat and Design 38 single coat. The images show that, by combining coats and reducing soluble salt content and controlling hard and soft material particle size to same distribution, a more uniformly porous coating with minimal cracks (essentially "crack free") has been achieved.

Figure 10:
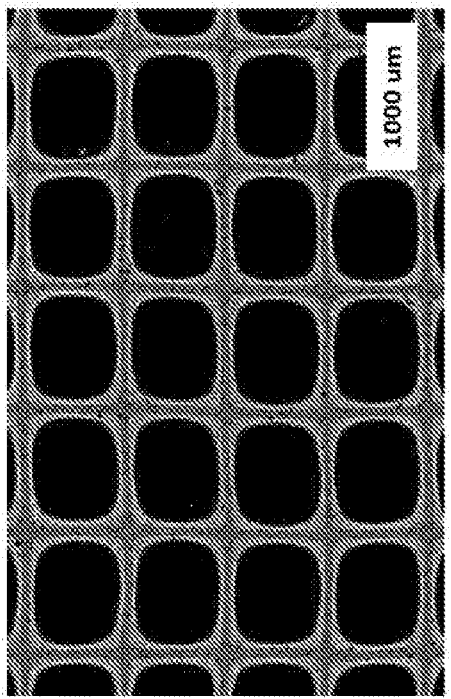
FIG. 10 provides SEM images of catalytic articles prepared according to the Examples provided herein.
Figure 10:
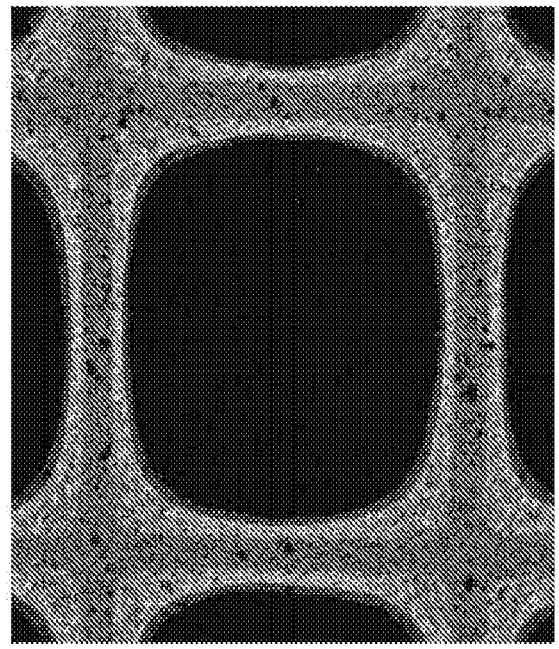
Figure 10:
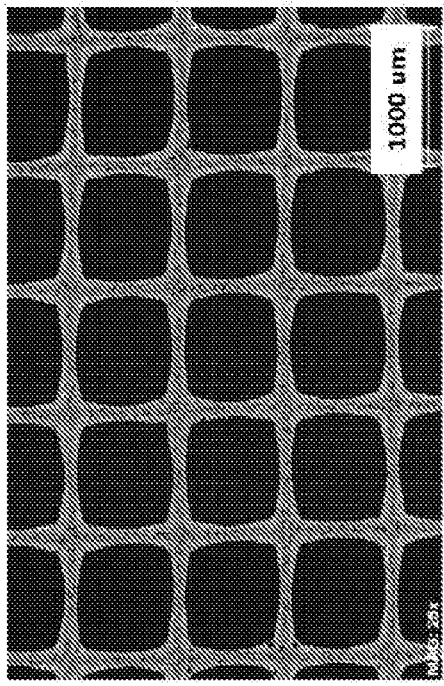
Figure 10:
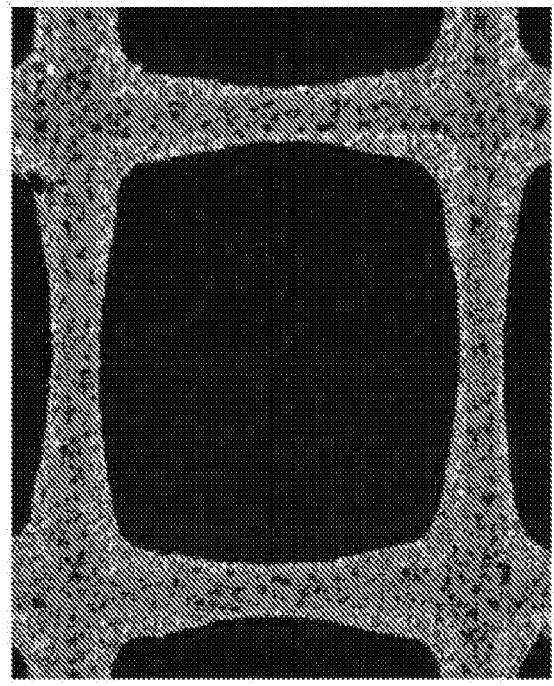
Figure 11:
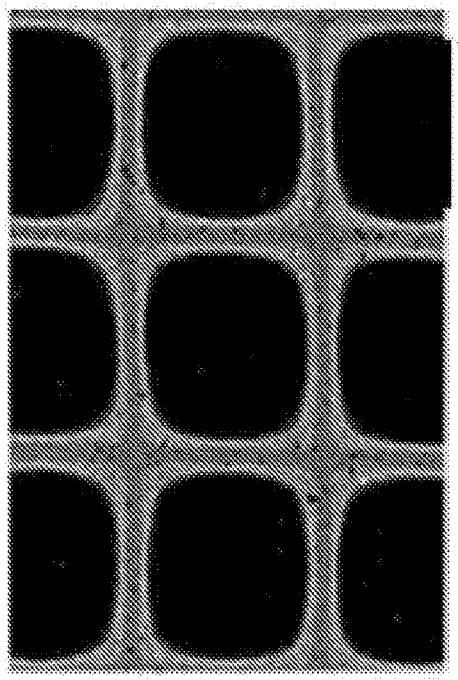
FIG. 11 provides SEM images of catalytic articles prepared according to the Examples provided herein.
Figure 11:
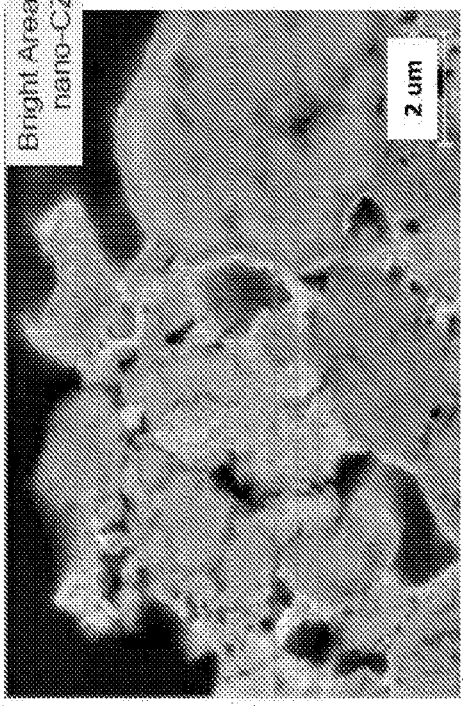
Figure 11:
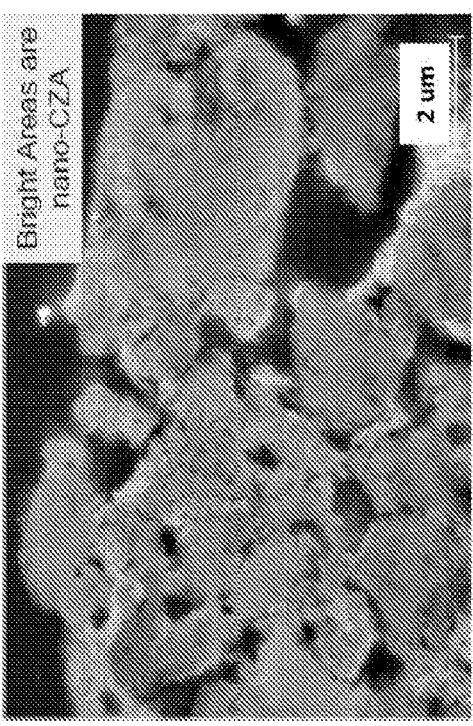

FIGS. 10 and 11 were generated to demonstrate the purpose of the "functional binder." The dual purposes of the functional binder in certain embodiments and described in greater detail hereinabove is to coat the surface of the catalytic particles and to form pools of particles between the much larger catalytic particles, binding them together to form a cohesive, yet open structure. FIG. 11 is a high magnification view, which contrasts alumina as dark grey/black and nano-$CeO_2$/$ZrO_2$ functional binder as light grey/white.

Example 6—Comparative Testing

Figure 12:
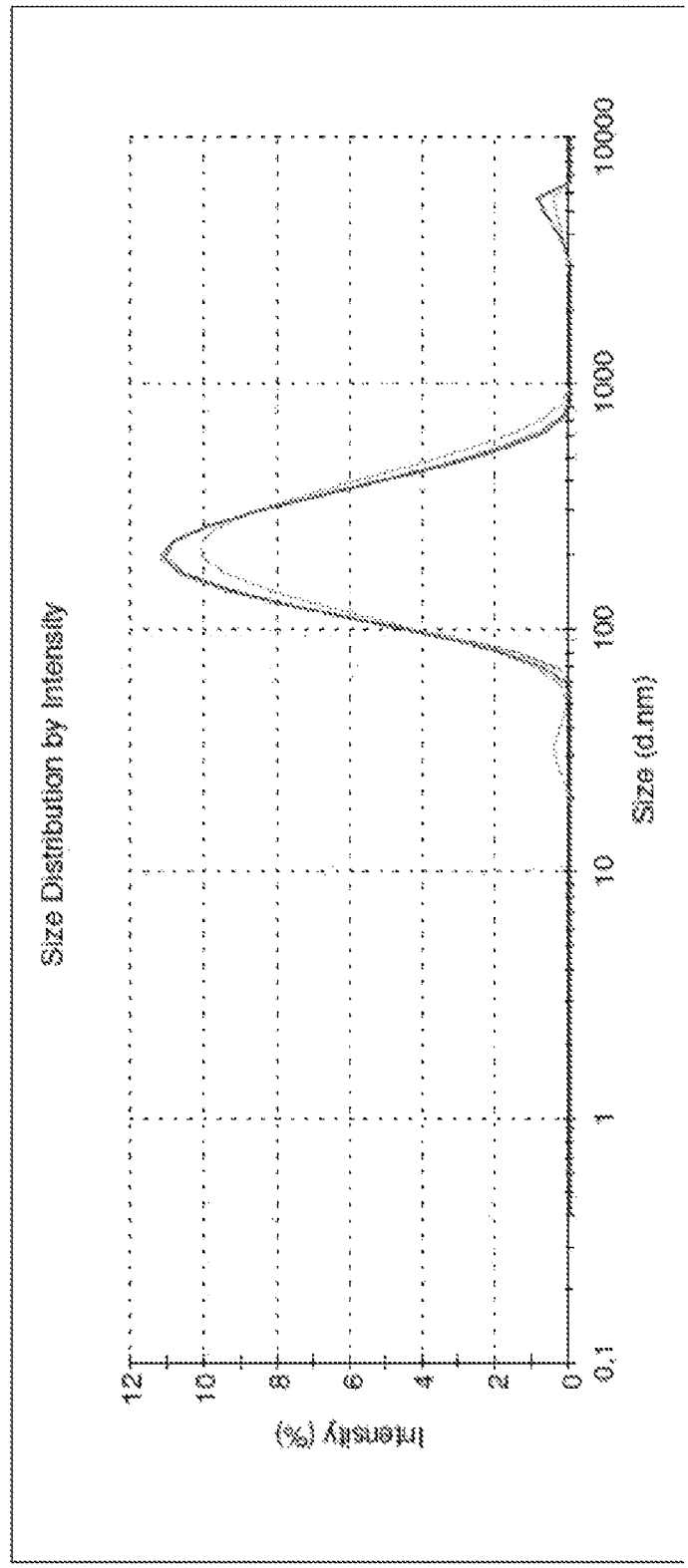
FIG. 12 is a graph of size distribution by intensity for catalytic articles prepared according to the Examples provided herein.

A nano-sized functional binder mixture of $CeO_2$ and $ZrO_2$ in a 50/50 weight ratio having an average particle size of about 22 nm, as exemplified in FIG. 12 (binder (a)), was prepared and compared against: (b) a premium solid solution Ce/Zr with formula $Ce_{0.47}Zr_{0.48}Nd_{0.05}O_2$ having an average (D50) particle size of about 5 μm; (c) a highly wet milled mixture of bulk $CeO_2$ and $ZrO_2$ having an average (D50) particle size of less than about 1 μm; and (d) a large crystal Boehmite Dispal (i.e., non-functional binder).

All binder compositions were prepared in slurry form with equivalent weight percentages of the binder components, and washcoat slurries were prepared by additionally incorporating equivalent amounts of rhodium and alumina into each slurry. To evaluate these washcoat slurries, a portion of each washcoat slurry was centrifuged and supernatant from each was taken for comparison. The slurries comprising binders (b) through (d) above each showed soluble Rh and colloidal particles present in the supernatant. Slurry (a), comprising the nano-sized functional binder, showed coloration comparable to solid nano-sized functional binder and colloidal particles were not seen after centrifugation, demonstrating that colloidal particles were not removable via centrifugation.

Figure 14:
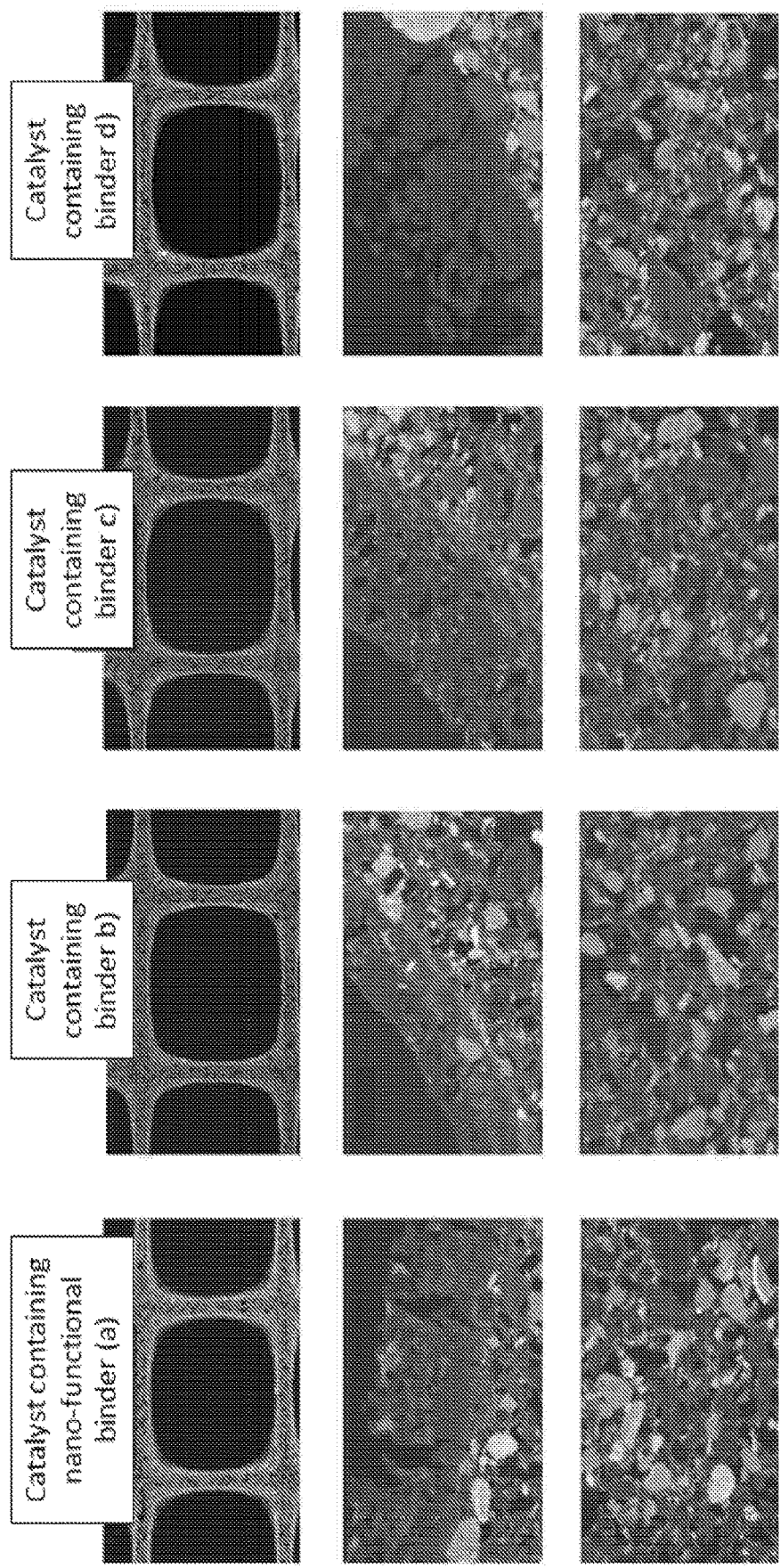
FIG. 14 provides SEM images of a catalytic article and comparative catalytic articles prepared according to the examples provided herein.

A common bottom coat on a catalyst substrate was used for testing, comprising $Ce_{0.40}Zr_{0.50}La_{0.05}Pr_{0.05}O_2$ solid solution Ce/Zr (OSC), alumina, zirconia, and barium. A slurry comprising these components was applied to cordierite substrates to give a dry gain of 2.6338 g/in$^3$ and each coated substrate was dried and calcined at 450° C. to form an active catalytic bottom coat. Each binder-containing slurry (comprising 0.85 g/in$^3$ large pore alumina milled to D90<13 μm, 0.15 g/in$^3$ binder, plus rhodium) was applied as a top coat on a bottom-coated cordierite substrate to give a total dry gain of 3.6338 g/in$^3$ for each coated substrate. The substrates were each dried and calcined at 550° C. to create an active catalyst top coating. Comparative SEM images of these catalysts are provided in FIG. 14, showing that the catalyst comprising nano-sized functional binder (a) in the top coat is porous as compared with the catalyst comprising non-functional, alumina binder (d) in the top coat. In the other two catalysts (comprising binders (b) and (c) in the top coat), the SEM image shows more dense packing of the components.

Severe multi-step washcoat adhesion testing was conducted on the catalyst comprising the nano-sized functional binder (a), as well as on comparative catalysts comprising binders (b), (c), and (d). The catalysts were each partitioned into three segments (top, middle, and bottom), and each segment was subjected to thermal shock steps, ultrasonic water bath steps, and air blowing steps to evaluate the adhesion of the catalyst washcoat under various conditions. In particular, catalyst segments were tested after heat/quench cycles at two temperatures, i.e., 850° C. and 980° C. Data provided from this testing is provided below in Table 5. WCA represents the washcoat adhesion percent loss (based on the difference between the catalyst segment mass before and after being subjected to the noted treatments). This test procedure is generally relied upon internally as demonstrating that catalyst washcoat adhesion is robust where total mass loss after such treatment is 6 weight percent or less.

TABLE 5

Severe Multi-Step Adhesion Testing

|  | Catalyst containing nano-sized functional binder (a) | Catalyst containing binder (b) | Catalyst containing binder (c) | Catalyst containing binder (d) |
| --- | --- | --- | --- | --- |
| Cool weight | 683 | 674.6 | 674.4 | 664.5 |
| Unit volume (in$^3$) | 74.93 | 74.93 | 74.93 | 74.93 |
| Data after heating at 850° C.: | | | | |
| Pre weight top | 4.755 | 4.661 | 4.642 | 4.446 |
| Post weight top | 4.662 | 4.594 | 4.567 | 4.415 |
| WCA % loss top | 1.969 | 1.440 | 1.620 | 0.700 |
| Pre weight middle | 5.506 | 5.140 | 4.736 | 4.639 |
| Post weight middle | 5.462 | 5.110 | 4.696 | 4.620 |
| WCA % loss middle | 0.800 | 0.580 | 0.840 | 0.410 |
| Pre weight bottom | 4.747 | 4.946 | 5.293 | 4.968 |
| Post weight bottom | 4.723 | 4.924 | 5.260 | 4.923 |
| WCA % loss bottom | 0.510 | 0.440 | 0.620 | 0.910 |
| Data after heating at 980° C.: | | | | |
| Pre weight top | 4.779 | 4.632 | 4.379 | 4.518 |
| Post weight top | 4.765 | 4.607 | 4.361 | 4.503 |
| WCA % loss top | 0.290 | 0.540 | 0.410 | 0.330 |
| Pre weight middle | 4.881 | 4.836 | 4.679 | 4.416 |
| Post weight middle | 4.825 | 4.807 | 4.654 | 4.391 |
| WCA % loss middle | 1.150 | 0.600 | 0.530 | 0.570 |
| Pre weight bottom | 4.783 | 5.229 | 5.079 | 4.915 |
| Post weight bottom | 4.764 | 5.210 | 5.064 | 4.899 |
| WCA % loss bottom | 0.400 | 0.360 | 0.300 | 0.330 |

The maximum loss for mass production catalysts or prototype samples manufactured with mass tooling is 6 weight percent. As demonstrated in Table 5, the catalyst comprising nano-sized functional binder (a) demonstrated washcoat adhesion values well within this specification limit.

Catalysts were aged as a system using an aging cycle at 938° C. for 107 hours with phosphorous and tested using a New European Driving Cycle (NEDC) test on a 2014 Ford 2.0L Escape. As shown below in Table 6, the results demonstrated that the catalyst comprising nano-sized functional binder (a) showed a greater than 35% improvement in NOx reduction as compared to the next most effective tested catalyst, which was the catalyst comprising binder (b).

TABLE 6

NEDC Summary

| Formulation | THC | NMHC | CO/100 | NO |
| --- | --- | --- | --- | --- |
| Catalyst containing nano-sized functional binder (a) | 0.095 | 0.063 | 0.149 | 0.029 |
| Catalyst containing binder (b) | 0.101 | 0.068 | 0.156 | 0.045 |
| Catalyst containing binder (c) | 0.103 | 0.073 | 0.173 | 0.048 |
| Catalyst containing binder (d) | 0.114 | 0.079 | 0.236 | 0.053 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article for purification of exhaust gases of combustion engines comprising a substrate having a washcoat on the substrate, the washcoat containing a catalytic component having a first average (D50) particle size and a functional binder component having a second average (D50) particle size of about 10 nm to about 1000 nm,
    wherein the ratio of the first average (D50) particle size to the second average (D50) particle size is greater than about 10:1, and
    wherein the washcoat has a porosity in the range of about 10% to about 50% as measured by scanning electron microscopy (SEM).

2. The catalytic article of claim 1, wherein the functional binder component has a structure selected from the group consisting of zeolite, Perovskite, spinel, composite, and combinations thereof.

3. The catalytic article of claim 1, wherein the functional binder comprises an oxide selected from the group consisting of transition metal oxide, a rare-earth metal oxide, and combinations thereof.

4. The catalytic article of claim 3, wherein the transition metal oxide comprises an oxide selected from the group consisting of zirconium oxide, copper oxide, nickel oxide, iron oxide, manganese oxide, and combinations thereof.

5. The catalytic article of claim 3, wherein the rare-earth metal oxide comprises an oxide selected from the group consisting of cerium oxide, lanthanum oxide, neodymium oxide, yttrium oxide, praseodymium oxide, and combinations thereof.

6. The catalytic article of claim 2, wherein the composite comprises a solid solution ceria/zirconia having the general formula $Ce_{0.5}Zr_{0.5}O_2$.

7. The catalytic article of claim 1, wherein the washcoat has porosity in the range of about 20% to about 30%.

8. The catalytic article of claim 1, wherein the catalytic component comprises a particle size distribution of d10>1.0 µm, d50 is about 3 µm to about 5 µm, and d90 is about 9 µm to about 13 µm.

9. The catalytic article of claim 1, wherein the catalytic component is selected from the group consisting of an SCR catalyst, a TWC catalyst, a diesel oxidation catalyst (DOC), or a catalyzed soot filter (CSF).

10. The catalytic article of claim 1, wherein the catalytic component comprises a high surface area metal oxide support and a component selected from the group consisting of a platinum group metal (PGM), a base metal (BM), an oxygen storage component (OSC), a molecular sieve, and combinations thereof.

11. The catalytic article of claim 10, wherein the high surface area metal oxide support comprises alumina and the functional binder comprises a ceria-containing oxygen storage component (OSC), wherein the alumina to OSC ratio by weight is about 0.5 to about 10.0.

12. The catalytic article of claim 1, wherein the functional binder component comprises less than about 5% of platinum group metal by weight.

13. The catalytic article of claim 1, wherein the substrate is a honeycomb substrate.

14. The catalytic article of claim 13, wherein the honeycomb substrate comprises a wall flow filter.

15. The catalytic article of claim 13, wherein the honeycomb substrate comprises a flow through substrate.

16. The catalytic article of claim 1, wherein the functional binder component comprises about 0.5 wt. % to about 40 wt. %, on a solids basis, of the washcoat.

17. The catalytic article of claim 16, wherein the second average (D50) particle size is about 10 to about 40 nm.

* * * * *